United States Patent [19]
Clark et al.

[11] Patent Number: 5,953,229
[45] Date of Patent: *Sep. 14, 1999

[54] DENSITY-BASED EMERGENT SCHEDULING SYSTEM

[75] Inventors: Steven J. Clark, Hamburg; H. Van Dyke Parunak, Ann Arbor, both of Mich.

[73] Assignee: Environmental Research Institute of Michigan, Ann Arbor, Mich.

[ * ] Notice: This patent issued on a continued prosecution application filed under 37 CFR 1.53(d), and is subject to the twenty year patent term provisions of 35 U.S.C. 154(a)(2).

[21] Appl. No.: 08/719,129

[22] Filed: Sep. 24, 1996

[51] Int. Cl.$^6$ ...................................................... G06F 17/60
[52] U.S. Cl. ...................................................... 364/468.06
[58] Field of Search ........................ 364/468.02, 468.05, 364/468.06; 395/670–674; 705/8, 9

[56] References Cited

U.S. PATENT DOCUMENTS

| | | | |
|---|---|---|---|
| 4,648,023 | 3/1987 | Powell | 395/670 |
| 5,093,794 | 3/1992 | Howie | 364/468 |
| 5,408,663 | 4/1995 | Miller | 395/674 |
| 5,619,695 | 4/1997 | Arbabi et al. | 364/156 |

*Primary Examiner*—James P. Trammell
*Assistant Examiner*—Matthew Smithers
*Attorney, Agent, or Firm*—Harness, Dickey & Pierce, P.L.C.

[57] ABSTRACT

A computerized task scheduler for negotiating and scheduling resources with respect to various manufacturing tasks via computerized agent technology. A manufacturing-related customer asks a computerized uniform process broker for a bid on a manufacturing task by specifying the task and the time when it is to be completed. The computerized uniform process broker finds a computerized resource broker which will perform the assignment at the lowest cost within the requested time frame. The computerized resource brokers use the requested time frame and their respective current available resources to determine a working window in which they can perform the task and at what cost. The determination of resources by the computerized resource brokers includes calculating their respective percentage of total commitment based upon the interrelationship between the working window and the time it actually takes to complete the task.

20 Claims, 14 Drawing Sheets

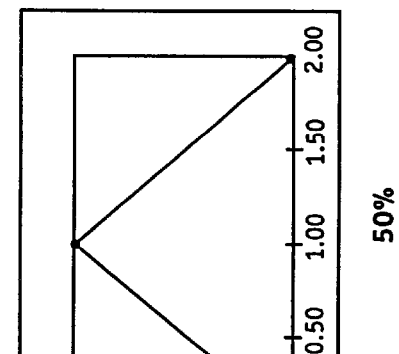
Figure 3a  
10%
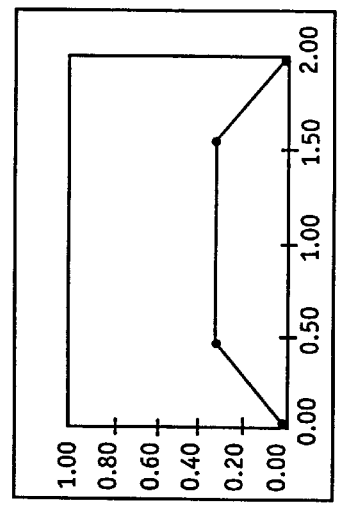
Figure 3b  
25%
Figure 3c  
50%
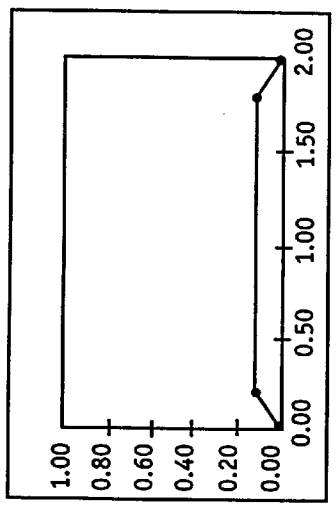
Figure 3d  
75%
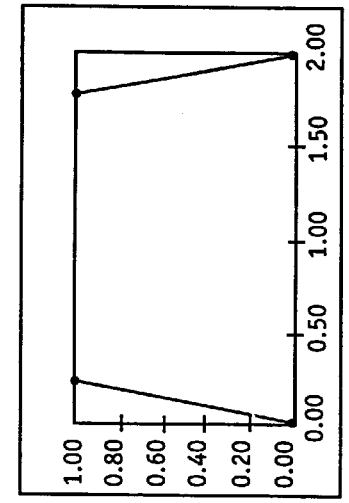
Figure 3e  
90%
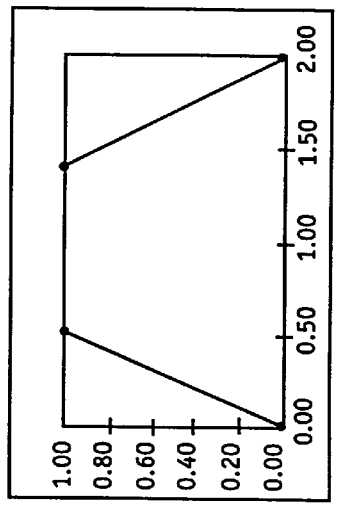

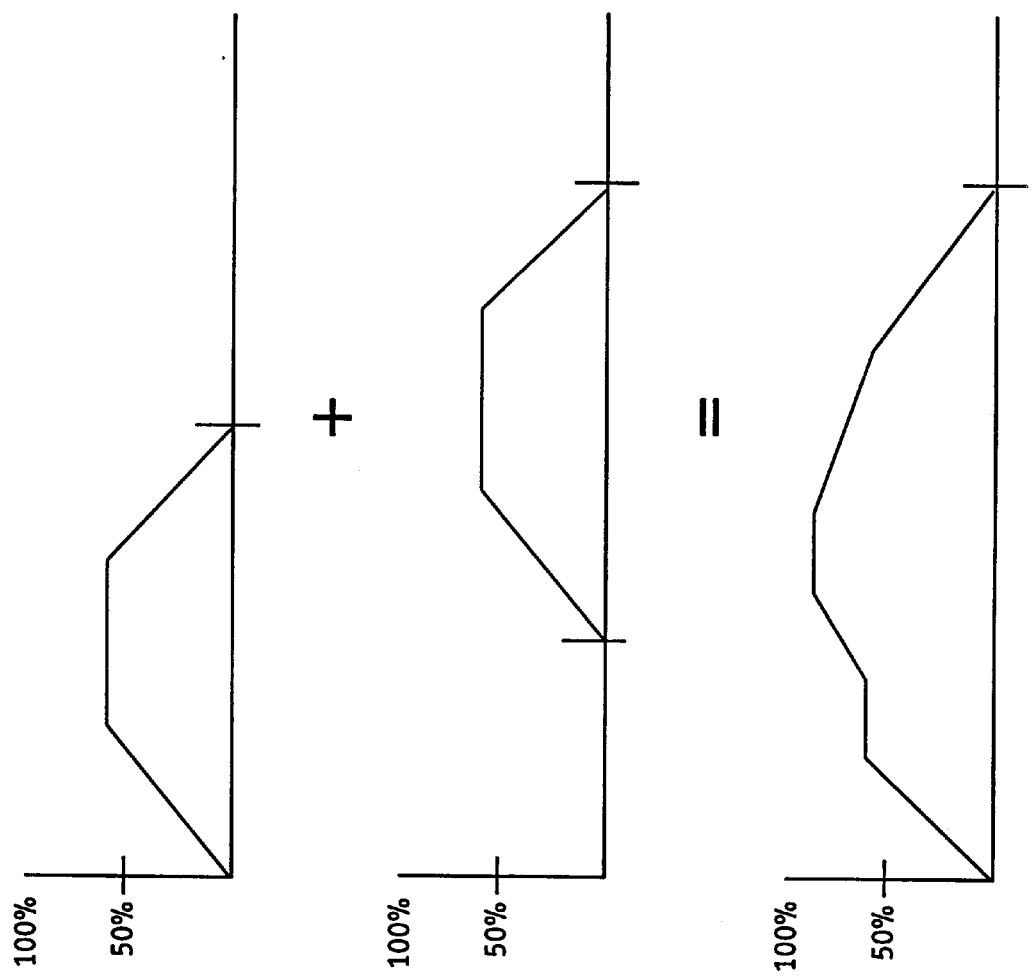

DENSITY-BASED EMERGENT SCHEDULING SYSTEM

BACKGROUND OF THE INVENTION

1. Technical Field

The present invention relates generally to task schedulers and more particularly to a computer-implemented system for flexibly scheduling tasks and allocating resources in manufacturing operations and the like.

2. Discussion of the Related Art

Conventional shop-floor control systems can be classified as pull, dispatched, or advance scheduled. A pull system entails an operation taking place only when there is a demand for its output. It is constrained by the capacity of its output buffer. When this buffer is full, it cannot produce more until someone consumes something from it.

A dispatch system entails an operation executing as long as there is work in its input buffer. When there are multiple jobs available, it selects among them on the basis of a dispatch rule.

In an advance scheduled system, a job is either unscheduled or assigned to a specific point in time. Once a job is scheduled, its location in time is fixed, and the time period it occupies is unavailable for other jobs unless the first job is rescheduled. Optimization of a schedule typically requires reconsidering which job runs when, and thus results in a great deal of backtracking.

SUMMARY OF THE INVENTION

The present invention avoids these and other problems of the related art by recognizing that the precise time at which a job or task runs is typically not as important as some larger window within which it must run. That is, the task cannot begin earlier than a certain time or end later than another time, but the overall period thus available for the task's execution may be much longer than the actual time that the task requires. Recognizing this, the scheduling system of the invention flexibly allocates resources in such a way that the ultimate resource commitment does not take place until job execution actually begins.

The scheduling system employs a computational mechanism that captures and computes time window start and end times, as well as task start and end times without making firm assignments of tasks to specific times, thus avoiding the need for backtracking and rescheduling. The actual assignment of a task to a specific time is deferred as long as possible. If the resource being scheduled is in heavy demand during some period of time, tight constraints are placed on when tasks in that period run, thus producing a linear schedule and ensuring maximum utilization of the resource. If the resource is lightly loaded during some period, a fixed ordering on the task is not imposed in that period, but will leave the resource free to dispatch them on other grounds, thus providing the flexibility and adaptiveness. Thus different resources, or the same resource at different times, can exhibit a range of scheduling behaviors from highly constrained to freely dispatched, depending on local requirements.

The present invention pertains to scheduling a plurality of tasks to be performed by a resource within predetermined commitment windows. Each of the tasks require a minimum period of time to be performed within the respective commitment windows. Each of the commitment windows have a period of time for performing respective task. The present invention includes a working window determinator for determining a working window for each task. The working windows are the periods of time within which the resource performs each respective task. The working windows have a period of time within the period of the commitment window of the respective task. The working windows contain the minimum task period for the respective task. Also, a commitment determinator coupled to the working window determinator determines a percentage of commitment over the respective working window for each task to be performed by the resource. Each of the percentage of commitments are respectively based upon the working window and upon the minimum task period of each task. Moreover, a scheduler coupled to the commitment determinator flexibly schedules the resource to perform each task based upon the determined percentages of commitments and the working windows of the tasks.

BRIEF DESCRIPTION OF THE DRAWINGS

In the accompanying drawings:

FIGS. 3a–3e are x-y graphs depicting the density behavior by varying the kernel while the working window remains fixed;

FIG. 5 is a set of x-y graphs depicting the addition of densities of two graphs and the resultant graph;

DETAILED DESCRIPTION OF THE PREFERRED EMBODIMENTS

The presently preferred scheduling system uses computer software agent technology—although agent technology is not a requirement of the system in its broader aspects. A software agent running on a computer system may be generated or instantiated to represent each resource that is available to be scheduled by the system. In a shop floor scheduling system, for example, a resource broker (RB) agent would be generated for each piece of equipment that may be called upon during a manufacturing process. Typically, a separate RB would be generated for each piece of equipment, allowing the utilization of each piece of equipment to be scheduled independently of the others. In a typical application there would be multiple resources and hence multiple RBs. To coordinate the activities, the system further includes a Unit Process Broker (UPB) agent that negotiates with individual RBs to schedule the requisite tasks in the proper sequence.

The UPB sends a request for bid (RFB) message to the RBs. The request for bid includes a time window within which the requested task must be performed. The RBs which are capable of supplying the requested services respond to the RFB with a bid message that includes an identification of one or more time windows during which the RB can supply the requested services (at some time within the originally requested time window specified by the UPB). The bid also includes a numeric "cost" factor corresponding to the scarcity of the particular resource at the particular time. In this regard, some resources will have higher costs at certain times of the day than others. These factors are taken into account in conveying the bid message to the broker. The UPB then evaluates all bids and selects the least costly one. The UPB then commits the RB to the bid time window. No constraint is placed on when the actual task will be performed within the commitment window. This leaves the RB free to adjust the window parameters to accommodate other tasks that may be scheduled at a later time.

Figure 1A:
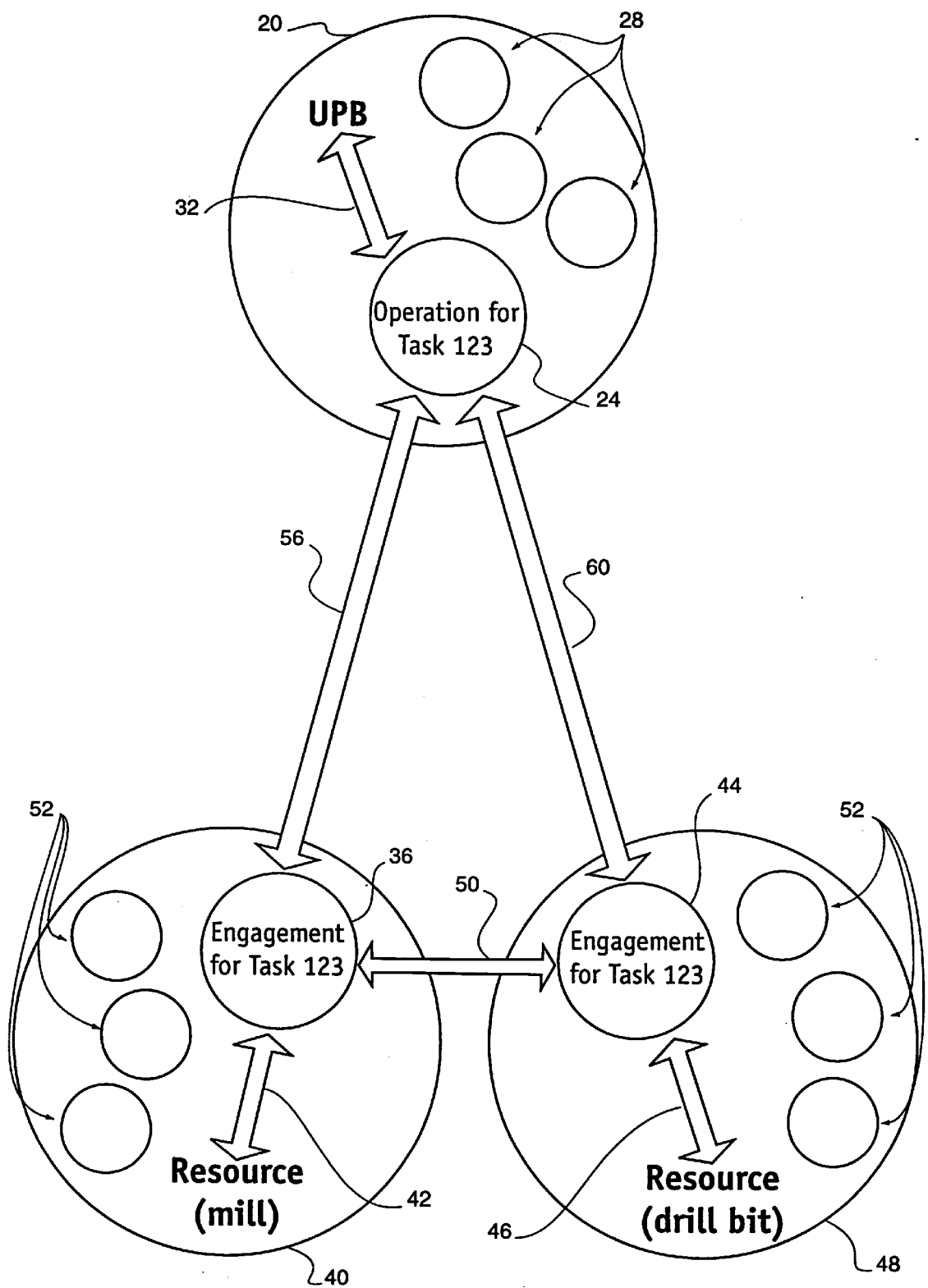
FIGS. 1a–1e are entity relationship diagrams showing the interrelationships among the components of the present invention.

FIG. 1a is an entity relationship diagram depicting the primary communication pathways among the UPB, RBs and their various created agents. When UPB 20 receives task 123, UPB 20 creates operation 24 to handle the task. Other operations 28 wait until UPB 20 receives other tasks. Operation 24 communicates with UPB 20 over communication pathway 32.

Engagements are created to handle the task transactions on the RB side of the task transactions. Engagement 36 is created to handle the task transactions for RB 40 which in this example is a resource for a mill. Engagement 36 and RB 40 exchange task transaction data over communication pathway 42. Engagement 44 is created to handle the task transactions for RB 48 which in this example is a resource for a drill bit. Engagement 44 and RB 48 exchange task transaction data over communication pathway 46. Engagement 36 and engagement 44 may exchange task transaction data over communication pathway 50. Operation 24 and engagement 36 exchange task transaction data over communication pathway 56. Operation 24 and engagement 44 exchange task transaction information over communication pathway 60. Other Engagements 52 await future tasks which may be requested from UPB 20.

Figure 1B:
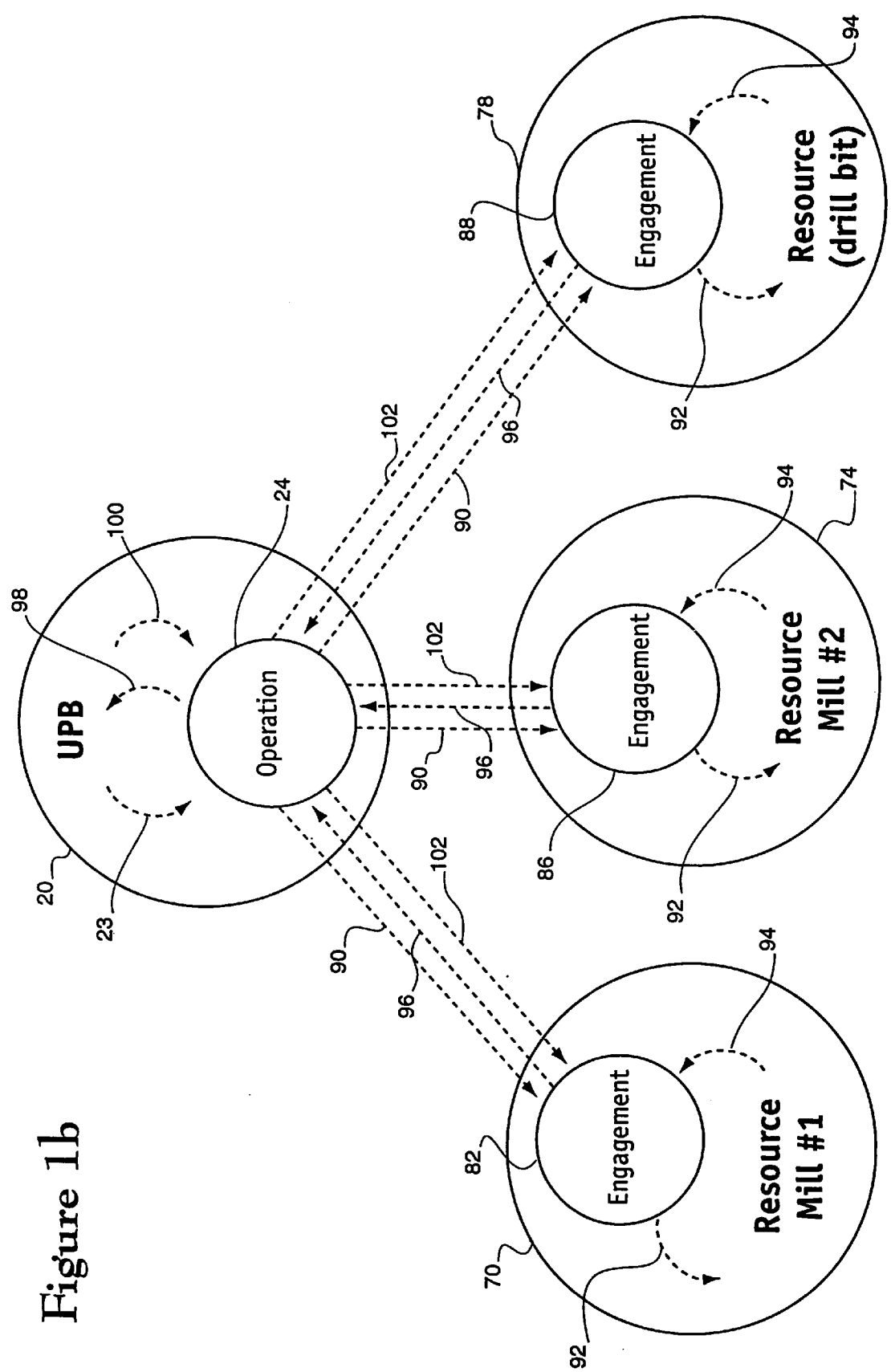

FIG. 1b shows an example of where entities of the present invention are involved in scheduling the manufacturing task of drilling a hole with a mill. UPB 20 creates with control flow 23 an operation 24 to determine how much it would cost to drill a hole with a mill. This task requires the resource of a mill and the resource of a drill bit. In this example, RB 70 and RB 74 can provide the resource of a mill and RB 78 can provide the resource of a drill bit.

Operation 24 creates engagements (82, 86, and 88) respectively on RB 70, RB 74, and RB 78 with control data flow 90. Through data flow 92, each engagement asks its respective RB for the cost to perform the aspect of the task for which the RB is suited. Through data flow 94, each RB responds with its cost (called a "bid function"). The engagements (82, 86, and 88) report back to Operation 24 with the bids of their respective RB through data flow 96. Operation 24 takes the minimum of the mill bids from RBs 70 and 74 in addition to the minimum of the drill bit bid from RB 78 to produce a single summary bid. Operation 24 reports this summary bid back to UPB 20 through data flow 98. UPB 20 confirms the order to operation 24 (providing more parameters) through data flow 100. Operation 24 selects the best mill bid and the best drill bit bid and informs the engagements of the winners through data flow 102. The losing engagements are terminated.

Figure 1C:
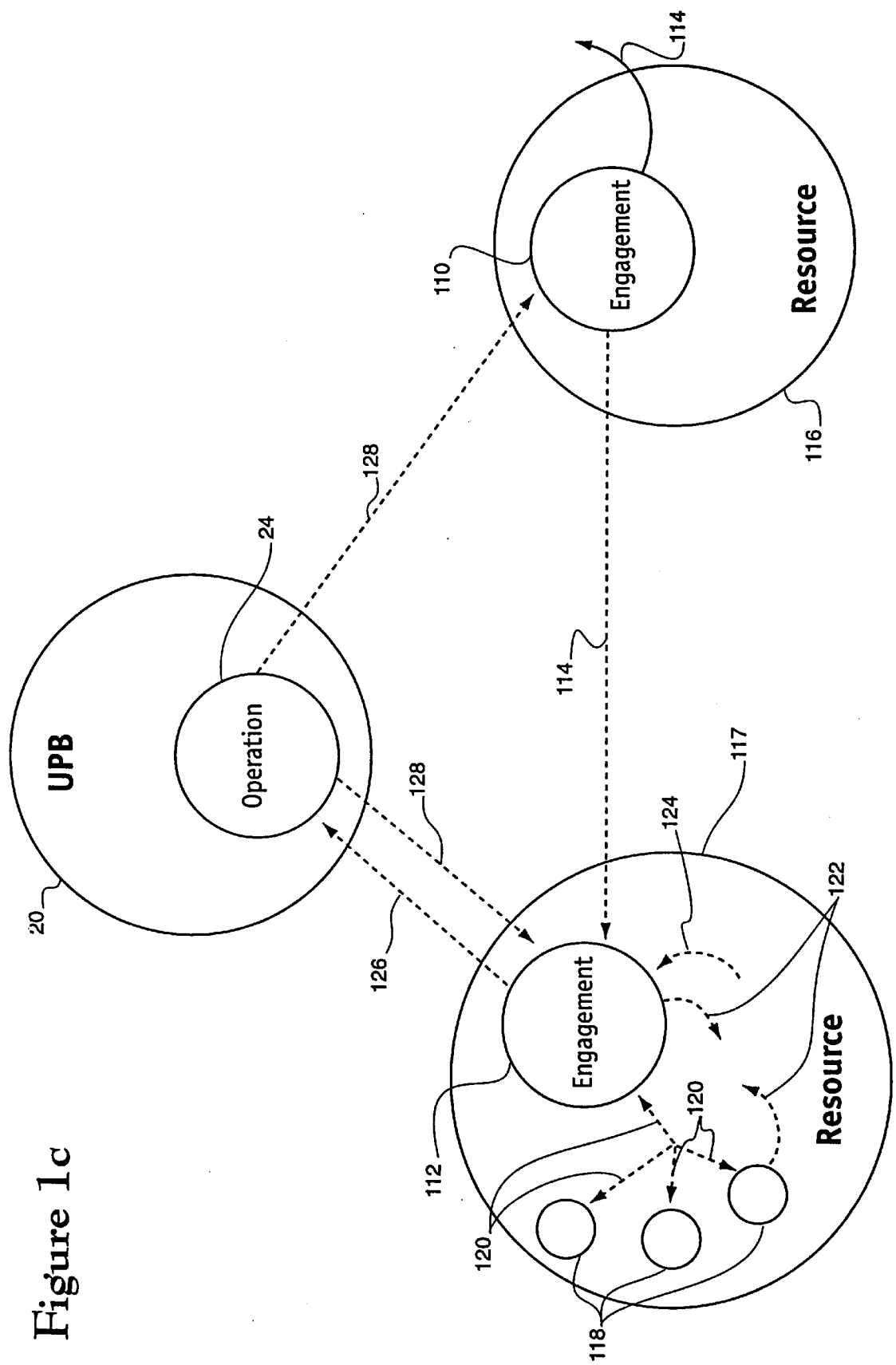

FIG. 1c shows the entities which are involved in cross-engagement communications. Engagement 110 informs engagement 112 and engagements on other RBs through data flow 114 that the cost parameters on its resource (that is, RB 116) have changed. RB 117 determines the "trouble spot" and asks other engagements 118 through data flow 120 the cost to move. The other engagements 118 respond through data flow 122 since they each have cost parameters for their sibling engagements. RB 117 selects the lowest cost/area engagement and has it move through data flow 124. Through data flow 126, Engagement 112 tells operation 24 to move. Through data flow 128, Operation 24 tells all engagements to move so that the engagements all move in synchronicity.

Figure 1D:
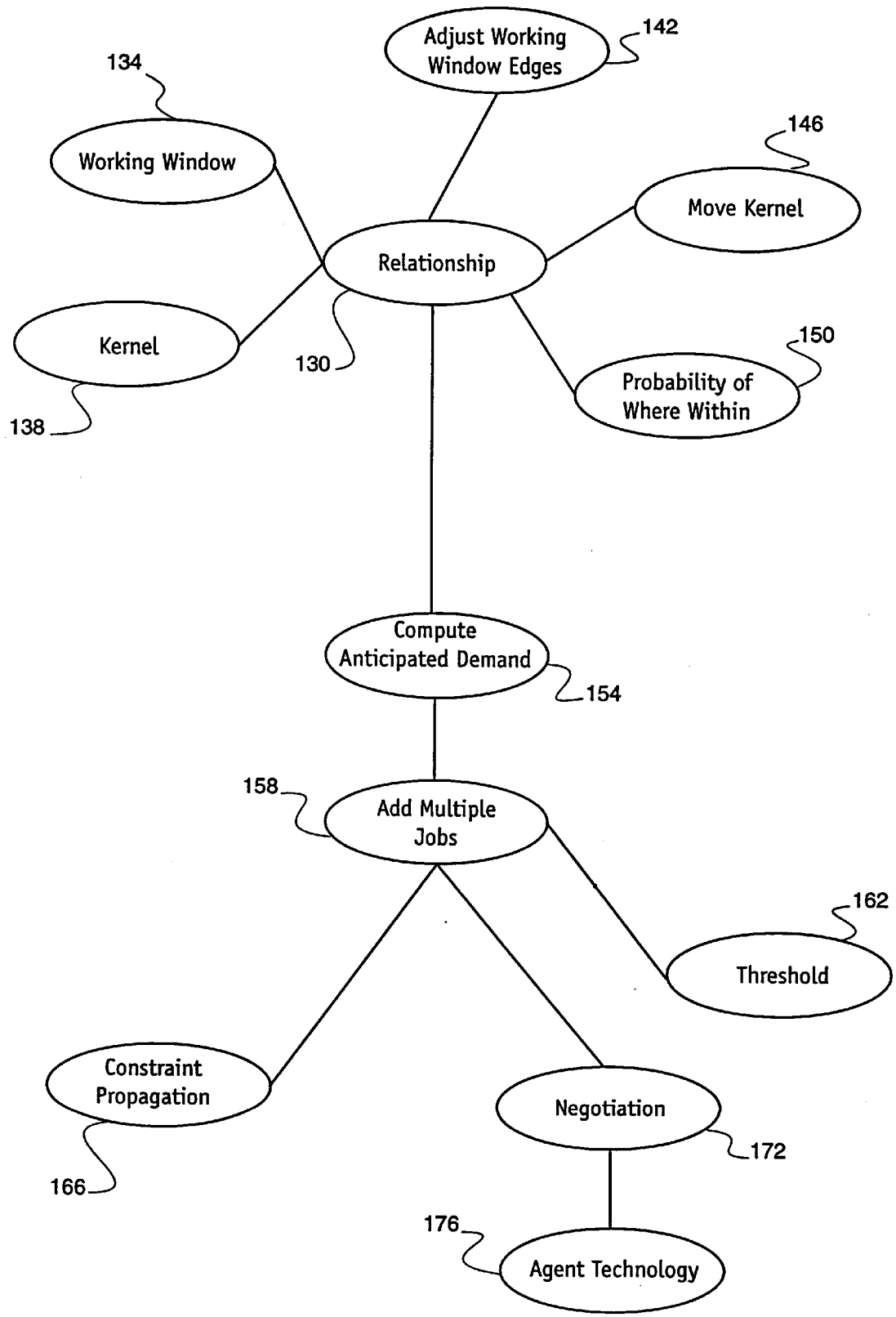

Referring now to FIG. 1d, the resources compute their cost to perform a particular task by using a relationship 130 between the working window 134 and the kernel 138. The working window 134 is the period of time within which a resource will commit to perform a task. The kernel 138 is the period of time actually needed by the resource to perform the task.

By establishing the relationship 130, the resource is able to adjust the working window edges in order to more flexibly accommodate an additional task as shown at block 142. Also, the relationship 130 provides the resource with the mechanism for accommodating an additional task by moving the kernel as shown at block 146. The relationship 130 also indicates the probability of when within the working window 134 the resource will actually be working upon the task (as shown at block 150).

The resource uses the relationship 130 to compute anticipated demand upon the resource in accommodating an additional task as shown at block 154. This allows the resource to add multiple jobs as shown at block 158. The resource may only add multiple jobs if it can do so below a predetermined threshold 162. The threshold 162 can provide an upper limit for the amount of commitment a resource can have at a given time. This reduces the possibility that the resource might overextend itself. Specifically, the resource uses relationship 130 in adding multiple jobs for performing resource constraint propagation 166 and for negotiation 172 through agent technology 176.

Figure 1E:
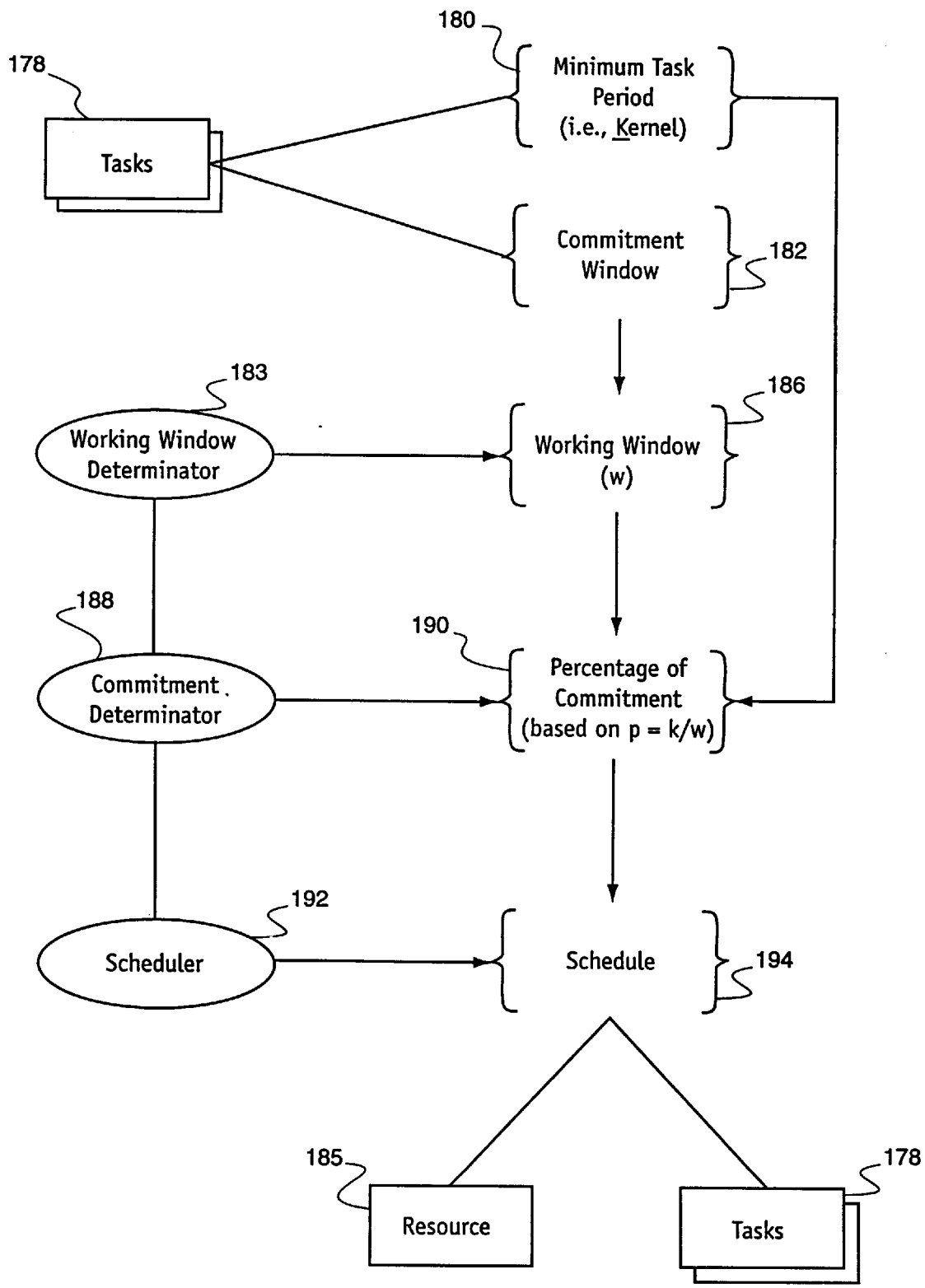

FIG. 1e describes in greater detail the relationship 130 as used by a resource 185 for a plurality of tasks 178. Each task requires a certain period of time to be performed. This period of time is the minimum task period or kernel 180. Also, each task needs to be completed within a predetermined time span which is known as the commitment window 182.

The present invention's working window determinator 183 determines for a resource 185 the time span in which the resource 185 can with varying levels of commitment work upon tasks 178. This time span for each of the tasks 178 is known as the working window 186.

A commitment determinator 188 calculates the percentage of commitment 190 for resource 185 based on the kernel 180 and the working window 186 for each of the tasks 178. The preferred embodiment bases the percentage of commitment 190 for resource 185 upon the ratio between the kernel 180 and the working window 186. A scheduler 192 produces a schedule 194 for when and for what cost the resource 185 may perform the tasks 178.

Definitions

Reservations for a given resource are held by a resource agent representing that resource, in a data structure called the resource's dance card. Changes are made to the dance card by an engagement, a transient agent that is docked at the resource agent and therefore has access to local methods on the resource agent. An alternative embodiment includes these methods being accessible via a more broadly accessible messaging interface.

When an external customer places an order for a product, a tree-like structure of chains of operations fanning in to the final product must be scheduled. Each individual operation is said to have an internal customer—the subsequent operation—and internal suppliers which constitute the previous operations.

A reservation for a resource is a data structure that includes a number of fields, such as (but not limited to) the identity of the operation that has made the reservation via one of its engagements and the identity of reservations on other resources that support the same operation. The three substructures of the reservation which are part of the task scheduling determination are the commitment window, the working window, and the kernel.

The Commitment Window (CW) is a time interval with two endpoints (CW.Start≦CW.End). CW.Start is the expected earliest date that the operation can begin and CW.End records the internal due date of the operation. In a sequence of operations, the CW.End of one operation will be the CW.Start of the next. Thus the CW represents the broadest time period within which the Operation can execute the order and satisfy the customer's expectations. For committed orders, the Resource updates CW.Start autonomously to keep it equal to Now. CW.End can only be changed by the Operation. A derivative quantity CW.Len=CW.End−CW.Start.

The Working Window (WW, with endpoints WW.Start≦WW.End) is a subset of the Commitment Window. That is, WW.Start≧CW.Start and WW.End≦CW.End. The WW records the period within which the Operation intends to execute. A derivative quantity WW.Len=WW.End−WW.Start.

The Kernel (K, a scalar) is a subset of WW. K is the time actually needed by the resource to execute the Operation. K depends on the process and the number of parts to be manufactured. The actual time at which execution of the Operation takes place is free to vary within the WW.

The Interrelationships Involving Engagements

FIGS. 2a–2e show the interrelationships of engagements. The abscissa axis is in units of time and the ordinate axis is percentage of commitment. Percentage of commitment measures the degree to which the resource probabilistically expects to be in use.

Figure 2A:
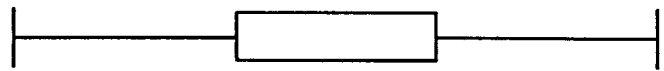
FIGS. 2a–2e are x-y graphs depicting the particle-wave duality of reservations.
Figure 2B:
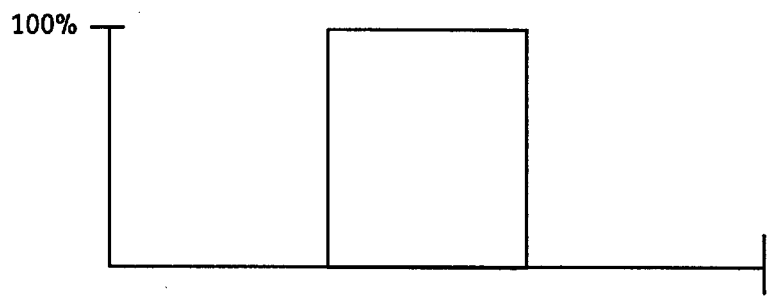
Figure 2C:
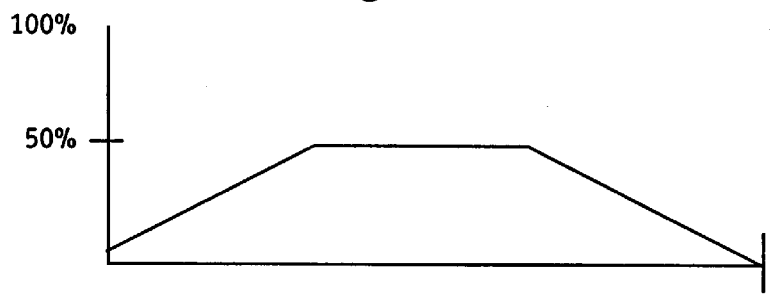
Figure 2D:
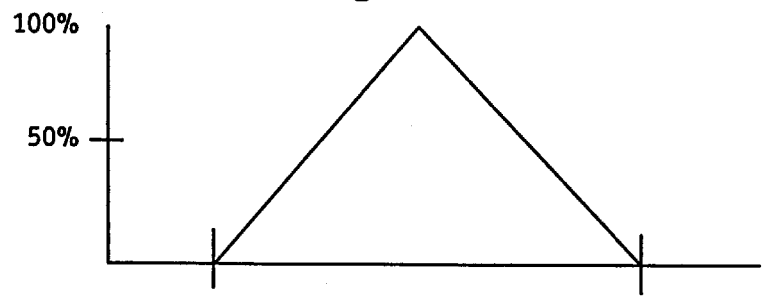
Figure 2E:
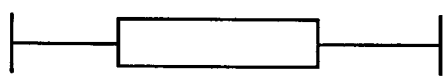
Figure 4A:
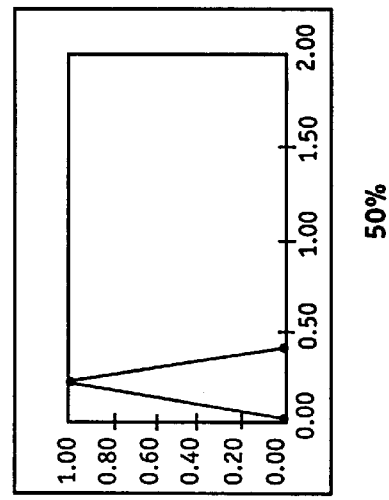
FIGS. 4a–4e are x-y graphs depicting the density behavior by varying the working window while the kernel remains fixed.
Figure 4B:
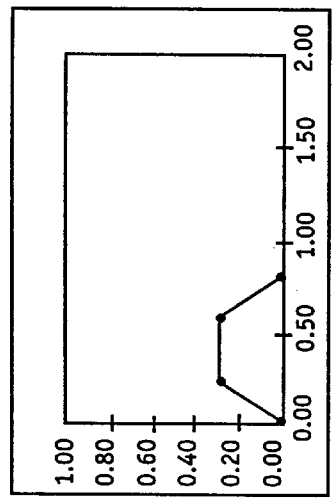
Figure 4C:
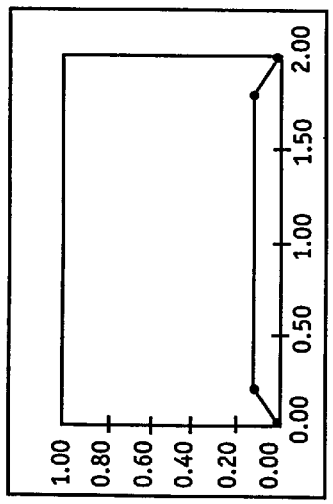
Figure 4D:
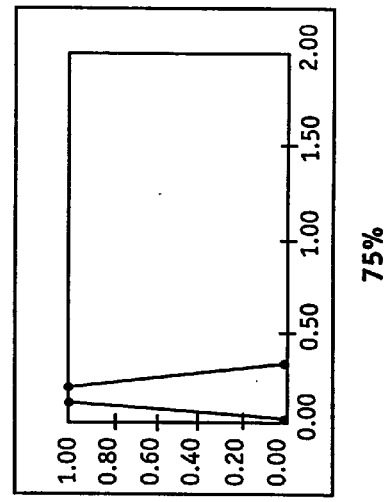
Figure 4E:
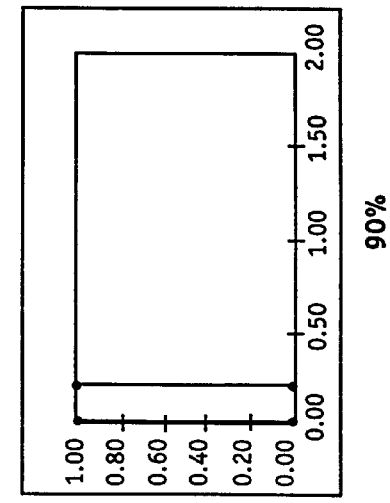

FIG. 2a shows a twenty minute kernel in a one hour work window. FIG. 2b shows the commitment density of demand for a fixed kernel location. FIG. 2c shows the commitment density if the kernel location is "free to float." FIG. 2d shows the commitment density as the work window shrinks. FIG. 2e shows the commitment density when the kernel has been localized more tightly.

FIGS. 3a–3e show how the shape of commitment density varies with the relation between kernel length and window length. With "w" being the work window width in units of time and "k" being the width of the kernel in units of time, then "p" is the percentage of the window that the kernel fills.

In this case, the window width "w" is kept constant at 2 time units and the width of the kernel "k" is varied to generate the varying percentages of overall load. FIG. 3a shows the width of the kernel as being 0.2 units of time when p is 10% and w is 2 units of time. FIG. 3b shows the width of the kernel as being 0.5 units of time when p is 25% and w is 2 units of time. FIG. 3c shows the width of the kernel as being 1 unit of time when p is 50% and w is 2 units of time. FIG. 3d shows the width of the kernel as being 1.5 units of time when p is 75% and w is 2 units of time. FIG. 3e shows the width of the kernel as being 1.8 units of time when p is 90% and w is 2 units of time.

FIGS. 4a–4e show the corresponding behavior when the width of the window changes and the kernel width is kept constant at 0.2 time units. For example, for densities less than 50%, the time coordinate of the left-top corner of the trapezoid remains the same, and in fact is the same as the kernel width. For densities greater than 50%, the left-top corner moves, but the right-top corner is fixed at the kernel width.

These diagrams reflect the dynamics which are often experienced in operation, since kernel width is defined by the work that needs to be done and the present invention focuses upon the issue of how large to make the working window.

Let w be the window width in units of time, and p be the percentage of the window that the kernel fills. The profiles generated by a single kernel and window are symmetrical, and can be characterized by the parameters in Table 1. The area under the profile is always equal to the width of the kernel.

TABLE 1

Parameters of Density Profiles

| Parameter | Meaning | Value | Value for p < .5 |
|---|---|---|---|
| h | highest percentage in the profile | $\min(1, p/(1-p))$ | $p/(1-p)$ |
| r | width of the ramp that joins the highest level to either end | $\min(p, 1-p)*w$ | $pw$ |
| s | \|slope\| of the ramp in density per unit time | $h/r = 1/(w(1-p))$ | $1/(w(1-p))$ |
| m | width of the horizontal "mesa" | $w - 2r$ | $w(1 - 2p)$ |

FIG. 5 illustrates how the commitment densities for separate reservations can be added together to form a density profile for the entire set of reservations. As long as this profile does not exceed 100%, the entire set can be executed. In practice, a threshold lower than 100% may be used to avoid overly brittle schedules.

Each reservation is a trapezoid (a triangle at p=0.5), with a piecewise linear shape including a starting point, an ending point, and two (or one) intermediate points. Thus the profile that results from summing a finite number of reservations must also be piecewise linear, and each joint between the segments corresponds to one of the four points in some individual reservation. If the dance card contains n reservations, its profile will have at most 4n joints, fewer if some of the reservations are at p=0.5 or if some reservations have points at the same instant of time (assuming that the reservations are at p=0.5 and that no two points are at exactly the same time).

The term "profile" refers to the overall dance card. The term "reservation" refers to the density function of a single reservation. Similarly, "point" refers to one of the discontinuities on a reservation, while "joint" refers to the similar discontinuities on the dance card density function.)

Detailed Background of Commitment Density Function

Summarily, the variables described in this section include:

| Variable | Name | Type |
|---|---|---|
| k | Kernel | Duration |
| $t_s$ | Start Time | Time |

-continued

| Variable | Name | Type |
|---|---|---|
| $t_e$ | End Time | Time |
| $W = (t_s, t_e)$ | Window | Time, Time |
| $w = t_e - t_s$ | Window Width | Duration |
| $e = (k, W) = (k, t_s, t_e)$ | Engagement | Duration, Time, Time |
| d | Dance Card | Set of Engagements |
| u | Utilization | Percent |
| U | Utilization Function | Percent as a function of Time |

With these variables noted above, a more rigorous description of the commitment density function is as follows. A commitment density function is denoted dns(t,e), or equivalently dns(t,k,W) or dns(t,k,$t_s$,$t_e$). The commitment density function is zero outside the interval [$t_s$,$t_e$]. Usually the commitment density function is considered to be a function of time, parameterized by the engagement.

$$dns(t, k, t_s, t_e) : (time, duration, time, time) \rightarrow percent$$

The commitment density function is derived from an assumption on the probability distribution describing when the kernel actually begins, sometime within the window. Let X be a continuous random variable that denotes the time the kernel begins. $Fx(x) = P(X \leq x)$ is the distribution function of X. As noted above, the commitment density function is the probability that the time t lies within the kernel.

$$\begin{aligned} dns(t, k, t_s, t_e) &= P(t \in [X, X+k)) \\ &= P(X \leq t < X+k) \\ &= P(t-k < X \leq t) \\ &= P(X \leq t) - P(X \leq t-k) \\ &= Fx(t) - Fx(t-k) \end{aligned}$$

The standard density function is the commitment density function that results from assuming X is uniform. Since X denotes the beginning of the kernel, it ranges from $t_s$ to $t_e - k$. The uniform distribution function on the interval [$t_s$,$t_e - k$] is $$Fx(x) = \begin{cases} 0, & x < t_s \\ \dfrac{x - t_s}{t_e - k - t_s}, & t_s \leq x < t_e - k. \\ 1, & x \geq t_e - k \end{cases}$$

Evaluating $Fx(t) - Fx(t-k)$ we get the definition of the standard density function. The function is trapezoidal: it rises from 0 at $t = t_s$ linearly to the lesser of $t_s + k$ and $t_e - k$, followed by a constant region to the greater of $t_s + k$ and $t_e - k$, and finally drops linearly back to 0 at $t = t_e$.

$$dns(t, k, t_s, t_e) \equiv \begin{cases} 0, & t < t_s \\ \dfrac{t - t_s}{t_e - t_s - k}, & t_s \leq t < t_s + k \wedge t < t_e - k \\ \dfrac{k}{t_e - t_s - k}, & t_s + k \leq t < t_e - k \\ 1, & t_e - k \leq t < t_s + k \\ \dfrac{t_e - t}{t_e - t_s - k}, & t_e - k \leq t < t_e \wedge t_s + k \leq t \\ 0, & t \geq t_e \end{cases}$$

It is often more convenient to divide the standard density function into two cases: $t_s + k < t_e - k$ (the "wide window" case) and $t_e - k < t_s + k$ (the "narrow window" case). Below is a rewrite of the definition of the standard commitment density function, split into these two cases.

$$dns(t, k, t_s, t_e) = \begin{cases} \begin{cases} 0, & t < t_s \\ \dfrac{t - t_s}{t_e - t_s - k}, & t_s \leq t < t_s + k \\ \dfrac{k}{t_e - t_s - k}, & t_s + k \leq t < t_e - k \\ \dfrac{t_e - t}{t_e - t_s - k}, & t_e - k \leq t < t_e \end{cases}, & t_s + k < t_e - k \\ \begin{cases} \dfrac{t - t_s}{t_e - t_s - k}, & t_s \leq t < t_e - k \\ 1, & t_e - k \leq t < t_s + k \\ \dfrac{t_e - t}{t_e - t_s - k}, & t_s + k \leq t < t_e \end{cases}, & t_e - k < t_s + k \\ 0, & t_e \leq t \end{cases}$$

Consider a conventional, non-probabilistic commitment in which a one-hour commitment is scheduled to take place starting at a particular time and ending exactly one hour later. In the terms used here, the window is necessarily the same size as the kernel: $k = t_e - t_s$. There is no random variable; there is no variability as to when, within the window, the kernel actually takes place. The commitment density function of such a commitment is $$dns_{nonprobabilistic}(t, t_s, t_e) = \begin{cases} 0, & t < t_s \\ 1, & t_s \leq t < t_e. \\ 0, & t_e \leq t \end{cases}$$

Note that $k = \int_{t=-\infty}^{+\infty} dns_{nonprobabilistic}(t, t_s, t_e) = \int_{t=-\infty}^{+\infty} dns(t, k, t_s, t_e) dt$. A proof that this is true for any assumption on the distribution function for X is left to the reader. The commitment density function is called a density function because it represents the degree to which the Resource has made an uncertain commitment, in such a way that the total commitment (i.e. the integral) is equal to the total commitment made with certainty. This "degree of commitment" is defined in terms of probability, but it is used also to represent expected utilization of the Resource that made the commitment.

Adjusting Reservations

Figure 6A:
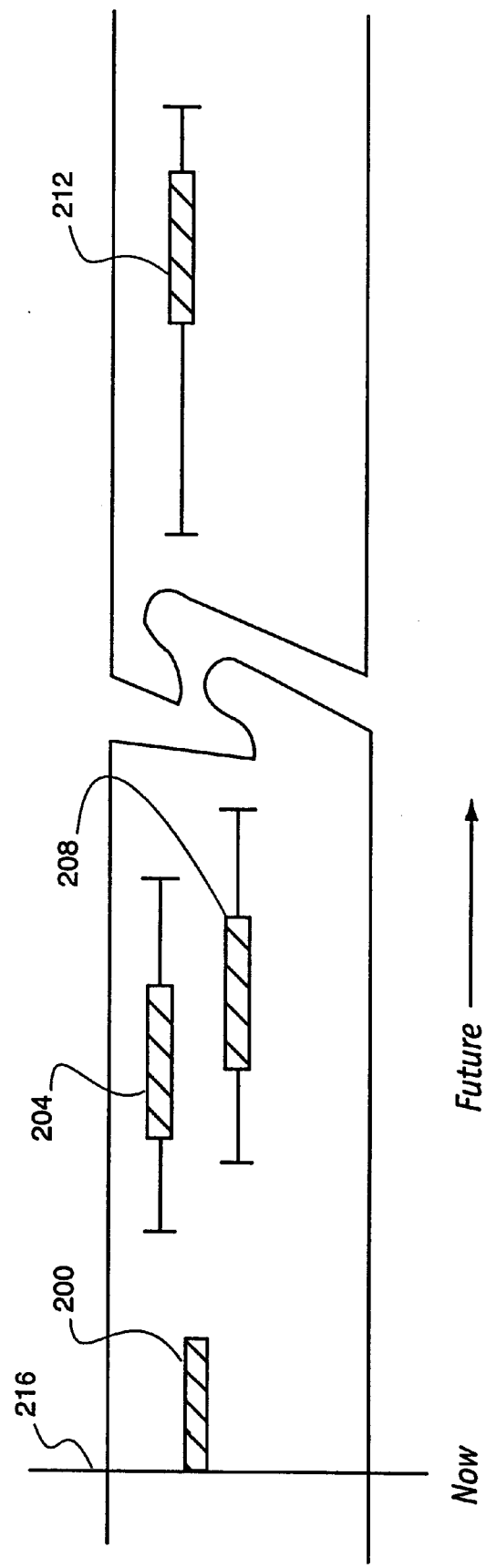
FIG. 6a is a time line showing present and future tasks to be performed by a Resource Broker.

FIG. 6a shows a time line for when tasks are to be performed by a particular RB. Task 200 is to be performed at the present moment while tasks 204, 208, and 212 are to be performed at a future time. The present invention provides flexible scheduling of the tasks until the task is scheduled to be performed at the "now" time line 216. Until a task reaches the "now" time line 216, an RB can reschedule the tasks in order to add additional tasks to its schedule. Once a task reaches the "now" time line 216 and is being performed, the system no longer attempts to reschedule or modify the executing task.

Figure 6B:
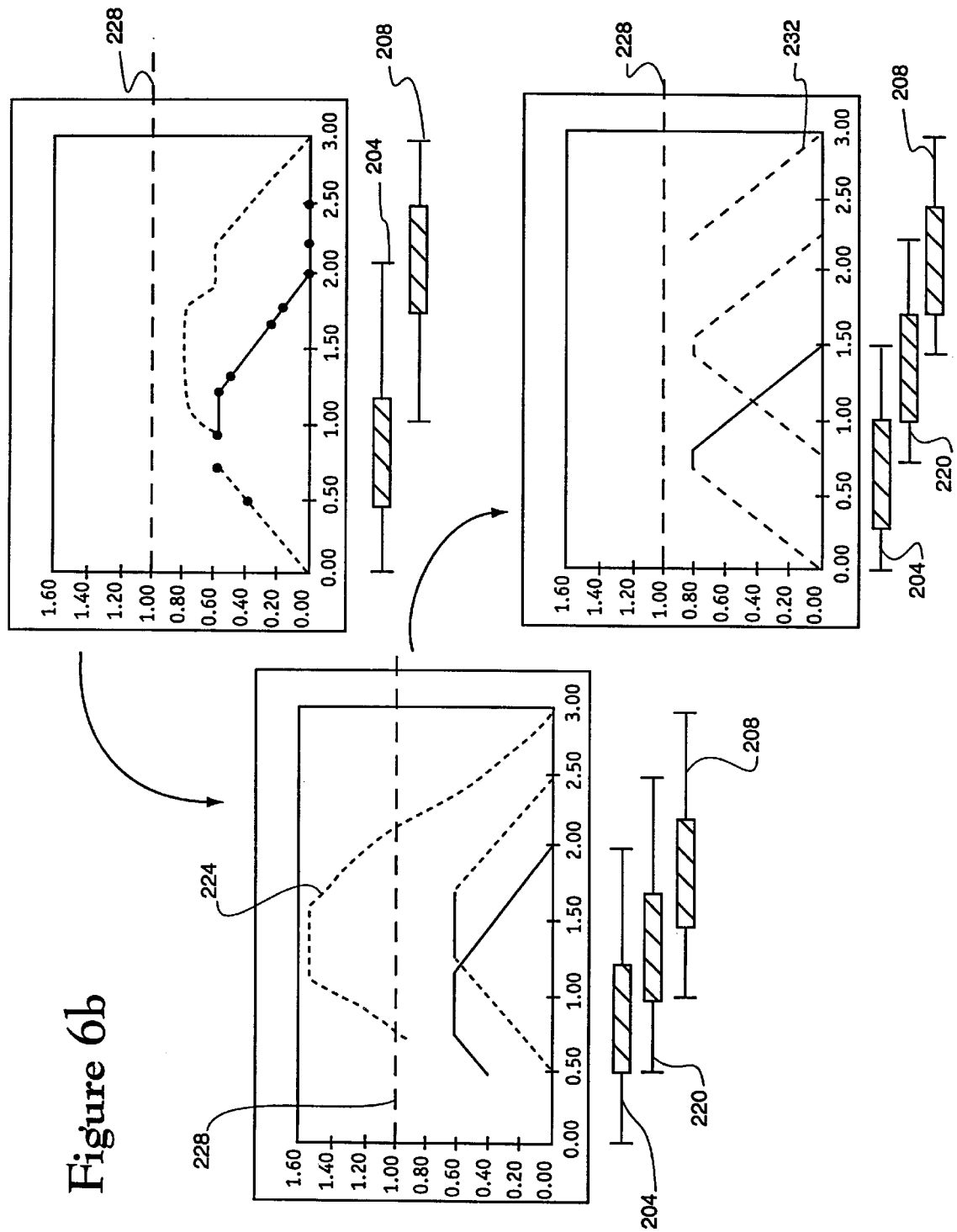
FIG. 6b is a set of x-y graphs showing the effect of adding a reservation.

FIG. 6b shows how an RB attempts to readjust its percentage of commitment profile when task 220 is added to it. The addition of a task is termed "adding a reservation." In FIG. 6b, task 220 pushes the profile 224 of the RB over the threshold 228. The WW's (work windows) of the reservations involved are subsequently manipulated so that the profile 232 is brought back below the threshold 228.

The present invention uses constraint propagation and negotiation to optimally manipulate the WW's of the reservations to bring the profile back below the threshold.

For constraint propagation, the WW is free to vary within the CW for any individual Operation, without affecting prior and subsequent Operations. A reasonable restriction to simplify the problem is only to shrink WW's—this eliminates the possibility of the system entering an infinite loop of adjusting and readjusting reservations, among other things. The basic idea is to do constraint propagation in a network of objects that includes individual reservations, the density profile of the dance card, and the points and line segments that make up each of these. Since the profile is piecewise linear with finitely many (4n) joints, any region that exceeds the designated density threshold (by default, 100%) contains a finite number of joints. If each of these points are pushed below the threshold, the region of violation (ROV) disappears. The constraint network shows us which reservations should be adjusted to manipulate which joints. The structure of the network, the constraints associated with each edge, and possible algorithms for relaxing the network are examined.

The Structure of the Constraint Network

Each joint on the profile is a point in two-dimensions: time and density. The time value of a joint is the time value of the point in the underlying reservation responsible for generating this joint. The density of each joint is the sum of the densities of all reservations that include the time coordinate of that joint, not only the reservation whose point generates the profile's joint. These observations are combined to form the dance card as a graph $G=<V,E>$.

The vertices $V=J \cup R \cup P$ include the joints J on the overall profile, the underlying reservations R, and the endpoints P of the working windows of each of those reservations. (The intermediate points in each reservation are determined by w, k, and the WW, and so need not be modeled separately.) The edges $E=U \cup M \cup Q$ include unique edges $U \subset J \times P$ connecting a joint to the WW limits of its generating reservation, multiple edges $M \subset J \times R$ connecting a joint to all reservations that include its time coordinate (and thus contribute to its density), and reservation edges $Q \subset (P \times R)$ connecting a WW boundary to its reservation.

Figure 7:
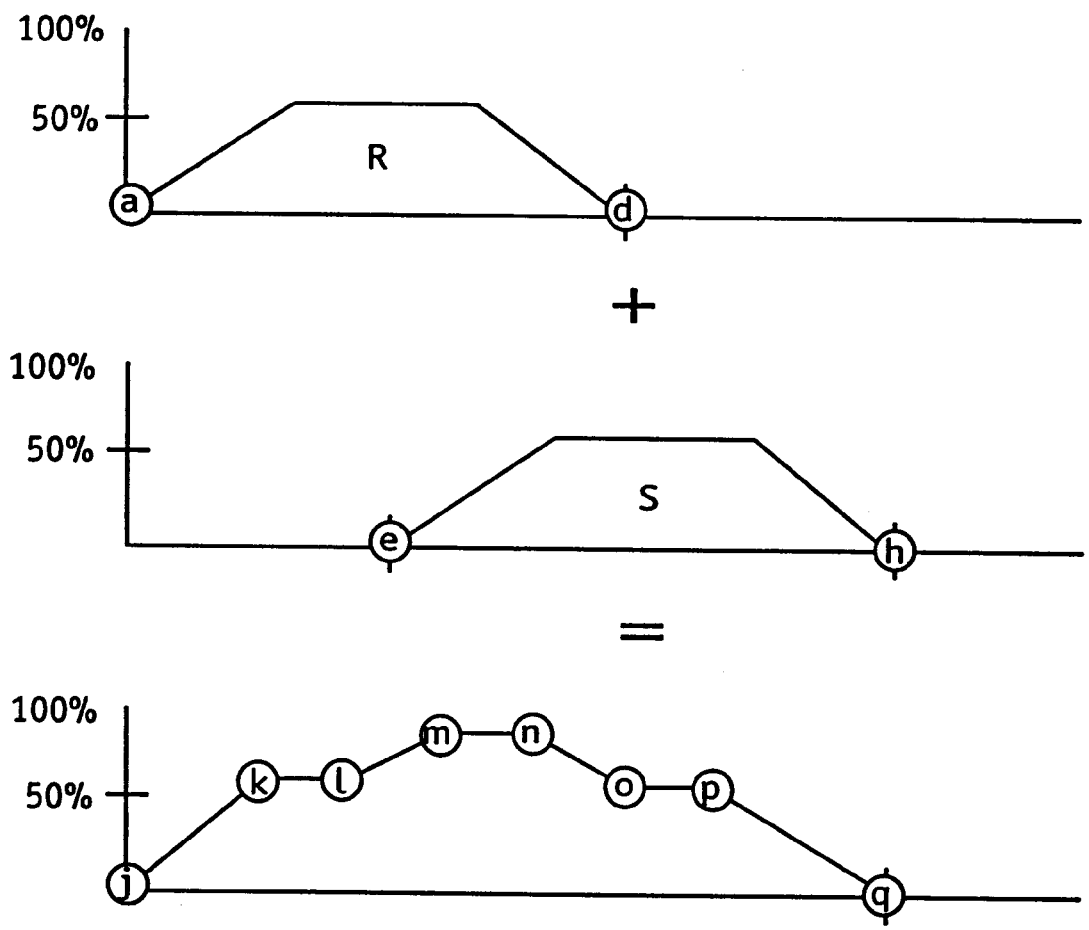
FIG. 7 is a set of x-y graphs depicting the addition of densities of two graphs along with their joints and the resultant graph.

FIG. 7 labels the reservations and vertices of the example of adding reservations shown previously as FIG. 5.

Figure 8:
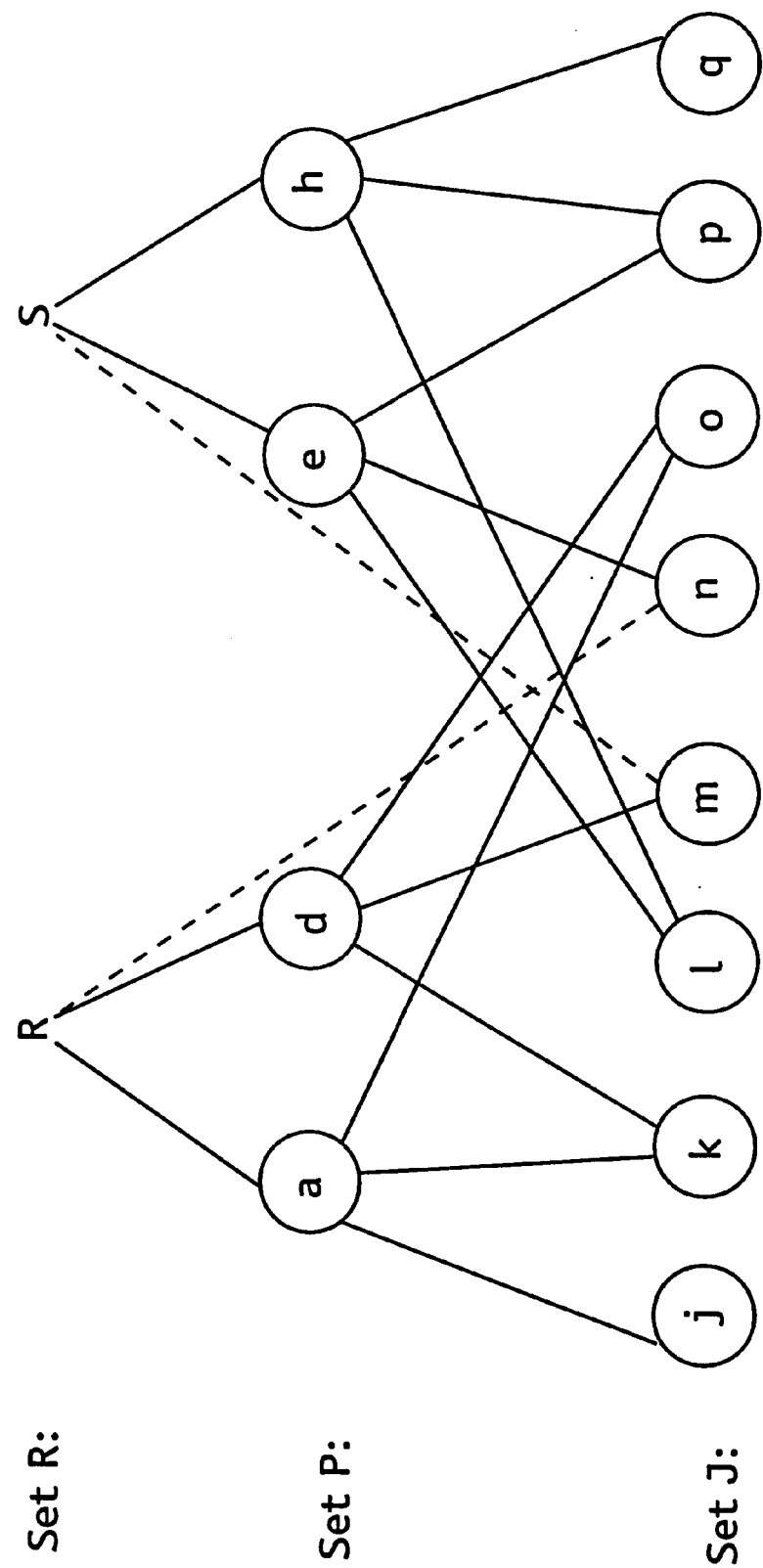
FIG. 8 is a constraint graph showing the constraint relationships of the entities appearing on FIG. 7.

FIG. 8 illustrates the resulting graph G. On graph G, the elements of J corresponding to the edge of a WW have a U-link to only one element of P, but those generated by one of the inner points of a reservation have U links to both endpoints of the WW, since the locations of both of those endpoints determine the location of the inner point.

The Constraints Propagated by the Edges

To use graph G of FIG. 8 for constraint propagation, the edges of the graph need to be labeled to indicate the nature of the changes that they can propagate. The U edges (those between sets J and P on graph G in FIG. 8) are straightforward. A shift in a reservation endpoint will change the times of the joints that it generates, and also their densities, as were indicated in FIG. 3.

Figure 9:
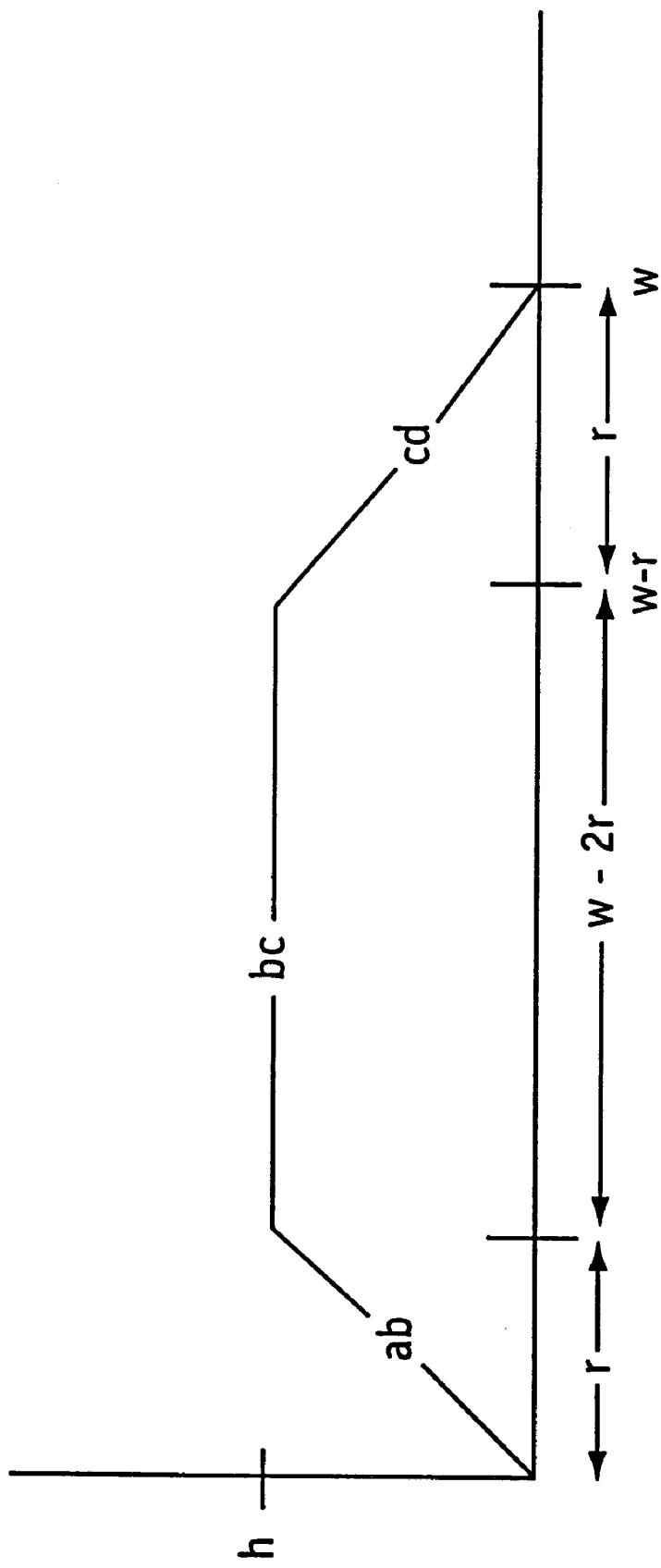
FIG. 9 is an x-y graph showing the density impact of "M" edges.

Propagating the effect of a reservation change along an M edge to a joint that falls within the time period covered by the reservation (the dashed lines between sets J and R) is more complicated. To examine this dependency more closely, the effect on the density at a time x caused by moving the right-hand end w of a reservation is considered, as shown in FIG. 9.

For simplicity, assume that $x>w/2$; a symmetrical argument can be made if this is not the case. In addition to the notation on the diagram, let k be the width of the kernel, and p be equal to "k/w". The relations in Table 1 above are also applicable here. Note in particular that the ramp width r can be expressed as $\min(k, w-k)$, or k in the case that $p<0.5$, w−k otherwise.

The contribution of the model reservation to the density at a time point x depends on x, w, and k. In particular, how the density at x changes for a fixed k as w moves needs to be determined. The resulting function is discontinuous in two ways. First, the reservation itself is discontinuous, at the junctions between the ramps and the mesa of the trapezoid. Second, the shape and behavior of the reservation changes discontinuously at $p=0.5$, as evidenced by the "min" functions in Table 1.

The partial derivative of the density with respect to w provides insight into this issue. When the partial derivative is positive, shrinking the WW by reducing w will reduce the overall density. When the partial derivative is negative, reducing w will increase the overall density. Table 2 gives the value of the density and its partial derivative with respect to w as a function of x, w, and k, when x falls in each of the regions defined by these discontinuities.

If $p<0.5$ and x is on the mesa, w may be reduced to the point that the edge of the mesa slides past x, leaving x on the ramp. In this case the density at x will initially increase as the mesa rises, then decrease as x "falls over the edge." Since the ramp width does not vary with w for $p<0.5$, a reduction $\Delta w$ in w will push x off the mesa and onto the ramp just in case x is nearer than $\Delta w$ to the edge of the mesa. Such a shift does not in itself guarantee that the density at x will decrease, since the very top of the ramp will be at the newly elevated level of the mesa, but if $\Delta w$ is great enough, x will move far enough down the ramp to compensate for the elevation of the mesa. Let x be a distance $\Gamma$ from the edge of the mesa, and let w be the original window width. Then w must decrease by $\Gamma(w-k)/(w-2k)$ to move x far enough onto the ramp not to suffer an increase in density. Conversely, the transition region on the mesa within which x can benefit from a reduction $\Delta w$ begins $\Gamma=\Delta w(w-2k)/(w-k)$ from the edge of the mesa. This value of r is assumed in the table. The partial derivative of the density function is not typically meaningful in this case because a non-infinitesimal change in w is assumed; but the net effect of a change in w on the density at x is qualitatively the same as though the derivative were positive. (That is, a reduction in w drops the density.)

There is typically no need for a transition region in the case where $p>0.5$. as FIGS. 4a–4e above showed, for constant kernel width, in this region the right-top corner of the mesa is fixed in time, so that any x>k will remain on the ramp as long as x<w, and then will see zero density.

TABLE 2

The Density Function $\delta(x,w,k)$

| k/w < .5? | Location of x | $\delta(x,w,k)$ | $\partial\delta(x,w,k)/\partial w$ | Sign of $\partial\delta(x,w,k)/\partial w$ |
|---|---|---|---|---|
| Yes | Mesa (x < w − k − Γ) | h = k/(w − k) | −k/(w − k)² | − |
| Yes | Transition (w − k − Γ < x < w − k) | h = k/(w − k) | Not Meaningful | + |
| Yes | Ramp (w − k < x < w) | (w − x)/(w − k) | (x − k)/(w − k)² | + |
| No | Mesa (x < k) | 1 | 0 | 0 |
| No | Ramp (k < x < w) | (w − x)/(w − k) | (x − k)/(w − k)² | + |

Table 2 shows that reducing w will reduce the density at a point x when x is on the ramp or in the transition region, but will increase the density when x is on the mesa and $p<0.5$.

With the aid of Table 2 (for M edges) and FIG. 3a–3e (for U edges), an ordered pair (d,t) with each edge that terminates in an element of J. d∈{+, 0, -} indicates how the density at the joint will change if the underlying working window is reduced, and t ∈{P, 0, F} indicates whether the joint's time coordinate will move into the past or future.

Algorithms for Constraint Propagation

1. Pick the joint with highest density in the profile.
2. Follow U and M edges to identify all WW edges that could be moved in to reduce this density (d=-).
3. Select the WW edge to adjust based on the (d,t) labels on its U and M edges. The selection criterion is where most of the constraint-propagation smarts gets added. At a first cut, select the one that has the fewest d=+ labels (that is, that will push up the fewest other joints). But some will have to get pushed up. The current densities of the joints linked to each WW edge with d=+ are examined, and the WW edge whose + links go to joints that are below threshold are selected. For the preferred embodiment, a window with low p rather than one with high p is shrunk.
4. Reduce the selected WW edge.
5. This changes the profile, so go back to step 1.

For the preferred embodiment, the WW at each step is reduced as a convex function of p; that is, "loose" windows (with small p) can shrink faster than tight ones. Another embodiment decides on the fraction "w-k" should be shrunk for very loose windows (say, 20%). Call this factor F. Then the amount to shrink w-k at loading p could be $F(e^{1-p}-1)/(e-1)$.

Each joint will have two U links, and the number of M links will be linear in the number of overlapping reservations. The total number of joints is on the order of 4* the number of reservations, so if the entire dance card is above the threshold, we'd be dealing with at most $O(n^2)$ links (n reservations, all piled up on each other, and 4n joints; selecting a joint is O(n), and selecting a reservation to adjust is O(n)).

Merging Adjacent Reservations

To illustrate how adjacent reservations can be merged, the merging of two adjacent windows for the same set of resources to save setup are considered. WS1=start of window "1"; WE2=end of window "2"; K1=kernel 1, WL1=length of window 1=WE1-WS1. S and E variables are time points; K and L variables are lengths of time. "3" is the merged structure. Also, K3=K1+K2, which amounts to ignoring the set-up times.

```
1      |-----xxxxx--------|

2                    |------xxxxx-------|

3            |-----xxxxxxxxxx--|
```

The merger is permissible as long enough of the merged kernel falls within each of the original windows to satisfy the original customers. There are really two conditions, one for each customer.

To satisfy the customer for engagement 1, $$WE1-K1>=WE3-K3 \quad \quad 1)$$

That is, if K3 is as late as possible it still starts early enough to satisfy engagement 1's client. Condition 1 will be satisfied as long as $$WE3<=WE1+K2 \quad \quad 2)$$

since then K3 cannot slide far enough to the right to invalidate condition 1.

Similarly, to satisfy the customer for engagement 2, the following is required:

$$WS3+K3>=WS2+K2 \quad \quad 3)$$

leading to the constraint $$WS3>=WS2-K1 \quad \quad 4)$$

Line 3 above shows a resulting window and kernel that will satisfy conditions 2 and 4.

Since individual reservations may be canceled down the road, a merged reservation needs to keep track of what atomic reservations have been combined in it. If one of these is later canceled, two adjustments to the merged reservation are needed by performing the following:

1. Reduce the kernel by the amount of the canceled reservation.
2. Since the working window of the combined reservation takes into account the offset provided by other kernels, one or both ends of it are moved in by the amount not greater than the width of the removed kernel.

Negotiation Approach

The negotiation approach focuses on the agents and objects in the system and their communications with each other. Unit Process Brokers (UPBs) and Resources are persistent agents. A UPB and a set of Resources can form an agreement in which the Resources will perform the unit process; this agreement is an engagement (lower case "e"). An Operation object in the UPB, and an Engagement object in each Resource, collectively represent that agreement. The Operation and Engagement objects can communicate via direct method invocation with other objects making up their respective agents; they can also communicate with each other via message passing.

Method invocation refers to conventional object-oriented-programming message sending, which is similar to function invocation and is possible only between objects in the same agent. Message passing refers to encapsulation of data into some kind of datagram which is delivered to one or more agents. Message passing can occur between agents running on different computers. Method invocation is much more efficient than message passing. When one object invokes a method on another, the first waits until the second returns control back to it. When one agent passes a message to other(s), it continues immediately much like mailing a letter. Eventually it may receive replies but it has to be organized in such a way that it continues to do other work in the meanwhile. Any information received via message passing is potentially out of date: something else may have already happened to the sender.

Message addressing is done by "subject". Rather than being addressed to one or more agents, each message is addressed to one subject. The message is delivered to all agents who subscribe to the subject. Typically the subject combines both the recipient agents and the message type. For example, if an agent can respond to three types of messages, then it would typically subscribe to three subjects, one for each message. This leads to a proliferation of subjects, but it combines two layers of dispatching (dispatch to subscribing agent(s), and within the recipient agent dispatch to the routine that handles the message type) into one.

It is each Resource's responsibility to discover regions of violation (ROVs). (As defined previously, an ROV is a period of time in which the sum of its engagements is greater than a threshold such as 100%.) The Resource determines the extent (ROV.W, a window) of an ROV and the area in excess of the threshold (ROV.Size, of type duration—an amount of time). The Resource asks each of its Engagements whose WW overlaps ROV.W the cost of reducing its area within ROV.W by ROV.Size. The Resource selects the Engagement with the least cost per unit area of ROV reduction and pays it to reduce its area within the ROV by an amount equal to the intersection of the ROV and the Engagement's density function.

This fragment of the algorithm must be low in computational cost and is computed by the Engagement object that is on the Resource, without interagent communication.

Once the Resource has selected target Engagement(s) to reduce (and by how much of ROV.Size each Engagement shall reduce itself), it pays the target Engagement(s) to do so. The Engagement(s) are committed to the reduction even if it means self-cancellation. The Resource must not revisit (or rediscover) the same ROV until the Engagement(s) have had time to move. The Resource marks the ROV as "pending"; the Engagement(s) report back when they have moved; and finally the Resource considers the ROV finished when all moves have been reported back. It is possible, due to dropped messages or simultaneous attempts to modify Engagements, that the reduction does not happen; once the Resource considers the ROV finished, it is free to rediscover the problem (if it persists) and start the process all over again.

When asked for the cost to reduce itself, an Engagement may report its cancellation fee if it cannot reduce itself within the ROV except to eliminate itself completely (and presumably re-schedule).

Note that circumstances may change between when the Engagement predicts the price it charges to reduce itself and when it actually does so. New orders may be scheduled, other Engagements on other Resources may shift, etc. Further, the Engagement can base its cost only on potentially out-of-date information received from its related Engagements. Each Engagement maintains within its CW either a summary or an estimate of the cost of all the other Resources or an individual estimate of each of the other Resources. It bases its price on the current cost of its Resource, its estimate of the cost of the other Resources, and the uncertainty involved.

It is entirely up to the Engagement to work out how it will adjust itself to reduce its area that overlaps the ROV. It may shrink, it may slide, or it may simply expand on its other end. For the preferred embodiment, an Engagement can make a discontinuous hop, as long as its WW remains within its CW.

For an Engagement to adjust itself, it informs its Operation. The Operation mediates (serializes) potentially simultaneous adjustments from several Engagements. The Engagement does not actually modify its WW directly, but issues a request to the Operation and responds to updates from the Operation. Also, the Operation is the sole repository of the money belonging to itself and its Engagements collectively.

Whenever the price charged for a move greatly differs from the actual cost incurred, the Operation notes this and initiates an update of the Engagements' estimates of each others' Resource costs.

As described above, an Engagement is a set of objects, one on each Resource involved in the engagement. These objects need to remain in sync with one another; they must agree on the CW, WW, and K parameters, for example. In order to reduce (mundane, not mathematical) chaotic behavior, all changes in the parameters are arbitrated by the Operation. Whenever an Engagement object needs to modify the shared parameters, it sends the change as a request to the Operation, and the Operation broadcasts a change order to all the Engagements. This ensures that multiple change orders are not sent out simultaneously.

The Resource is responsible for accepting new Engagements and adjustments of Engagements, and assessing fees for doing so. The Resource has to predict the cost it will incur as a result of the presence or adjustment of the Engagement. Unlike Engagements, it must stick to its prediction.

Functions for Bidding

Resources and Unit Process Brokers (UPBs) are agents. Engagements and Operations are transient activities on Resources and UPBs, respectively. Each Operation is associated with a group of at least one Engagements and each Engagement is associated with exactly one Operation. An Engagement is a transient activity that handles a variety of communication tasks; an engagement is a data structure.

Each Resource has a dance card, which is its set of engagements. An engagement has a kernel which is a duration, a start time, and an end time. A start time and end time together are called a window.

A customer asks a UPB for a bid. The UPB creates and initializes an Operation to manage the request for bid. The Operation is in the Enquiring state and knows the amount of time on each Resource type needed. Operation knows outer limits of period of time under consideration.

Operation (Enquiring) spawns Engagements (Enquiring) on all Resources of each needed type. Each Engagement reports back the cost function of its Resource, for the period under consideration. The cost function takes into account expected utilization, current commitments, profit margin, and uncertainty. For each Resource type, Operation takes minimum of cost functions of each Resource of that type. Then Operation sums these minima to get cost function of Operation. Operation adds profit margin and insurance against uncertainty to cost function. This cost function is reported to customer. The cost of a CW is computed using a standard formula based on the cost function. (Hence, no need to send a 2-dimensional function in order for the Customer to get cost as a function of CW instead of cost as a function of time.)

The utilization function $utl(t,d_r)$ of a Resource gives the expected utilization of that Resource as a function of time. It is derived completely from the Resource's dance card. Each time any of the Engagements of a Resource change, the Resource's utilization function also changes.

$$utl(t, d_r): \text{(time, set of engagements)} \rightarrow \text{percent}$$

$$utl(t, d_r) \equiv \sum_{e \in d_r} dns(t, e)$$

One alternative formulation $Utl(d_r)$ takes a dance card as parameter and returns a function; the returned function takes a time as a parameter and returns a utilization. This is useful when one must manipulate the utilization function (of time) as an entity in its own right. When the term "utilization function" is used as a type name, it means a function of time that returns a percent.

$$Utl(d_r): \text{(set of engagements)} \rightarrow \text{utilization function}$$

$$Utl(d_r) \equiv U(t) = \sum_{e \in d_r} dns(t, e)$$

At times it is more perspecuitous to write $utlr(t)$ for $utl(t,d_r)$. Note that $$utl(t, d_r) = utl_r(t) = Utl(d_r)(t).$$

This function is used by a Resource to derive its rate—the amount it charges for time—from its expected utilization. It is fairly arbitrary, although it must be monotonically increasing and its second derivative must be nonnegative (concave upward). It is explicitly represented. The rate based on utilization function is considered a parameter of each Resource. Notationally, it is used two ways: as a function of a utilization, that returns a rate; and as a function of a utilization function, that returns rate as a function of time.

$$rtu_r(u): \text{percent} \rightarrow \frac{\text{money}}{\text{time}}$$

$$rtu_r(U): \text{utilization function} \rightarrow \frac{\text{money}}{\text{time}} \text{ as a function of time}$$

Basic Cost Function

The basic cost function of a resource is the cost of its time, as a function of time, derived from its expected utilization. It is represented explicitly in each Resource, and is passed around in Messages from one agent to another. It is derived from the Resource's dance card using its utilization function and rate based on utilization function.

$$bcf_r(t): \text{time} \rightarrow \frac{\text{money}}{\text{time}}$$

$$bcf_r(t) \equiv rtu_r(utl_r(t))$$
$$= rtu_r(Utl(d_r)(t))$$
$$bcf_r = rtu_r \circ utl_r$$

Total Cost Function

The total cost function of a Resource is derived from its basic cost function and an engagement under consideration. It gives a dollar value of the engagement to the Resource. Resource fees are based on the total cost function. The utilization function of the Resource is made explicit so that it can reflect when an engagement under consideration is included in or excluded from the dance card.

$$tcf_r(k, t_s, t_e, U): \text{(duration, time, time, utilization function)} \rightarrow \text{money}$$

$$tcf_r(k, t_s, t_e, U) \equiv \int_{t=t_s}^{t_e} rtu_r(U(t)) dns(t, k, t_s, t_e) dt$$

$$tcf_r(k, t_s, t_e, Utl(d_r)) = \int_{t=t_s}^{t_e} rtu_r(Utl(d_r(t))) dns(t, k, t_s, t_e) dt$$

$$= \int_{t=t_s}^{t_e} bcf_r(t) dns(t, k, t_s, t_e) dt$$

Resource Fees

A Resource charges a fee based on its total cost function to an Engagement that commits to a location on its dance card. A Resource refunds a fee to an Engagement on it that vacates a region of its dance card, also based on the total cost function. Of course, the Engagement does not get a full refund. When an Engagement moves, the Resource makes the refund for vacating the prior location and charges for occupying the new.

The Resource's charge for a new engagement is derived from its dance card $d_r$, with the new engagement e added to it.

$$\text{fee}_{add}(e, d_r) = tcf_r(e, Utl(d_r \cup \{e\}))$$

The Resource's refund for a reneged or canceled engagement is derived from its dance card $d_r$, with the old engagement e removed from it. Note that this is shown as a negative fee.

$$\text{fee}_{remove}(e, d_r) = tcf_r(e, Utl(d_r - \{e\}))$$

If an engagement is added and then removed, the total cost is greater than zero. Keep in mind that the dance card used by the calculation of the refund includes the engagement that has just been added. Also, $e=(k, t_s, t_e)$.

$$\text{fee}_{add}(e, d_r) + \text{fee}_{remove}(e, d_r \cup \{e\}) =$$

$$tcf_r(e, Utl(d_r \cup \{e\})) - tcf_r(e, Utl(d_r))$$

$$= \int_{t=t_s}^{t_e} rtu_r(Utl(d_r \cup \{e\}))(t) dns(t, k, t_s, t_e) dt -$$

$$\int_{t=t_s}^{t_e} rtu_r(Utl(d_r))(t) dns(t, k, t_s, t_e) dt$$

$$= \int_{t=t_s}^{t_e} (rtu_r(Utl(d_r \cup \{e\})) - rtu_r(Utl(d_r)))(t) dns(t, k, t_s, t_e) dt$$

In the region $t \in (t_s, t_e)$, $Utl(d_r \cup \{e\}) > Utl(d_r)$. Because $rtu_r$ is monotonically increasing, $rtu_r(Utl(d_r \cup \{e\})) > rtu_r(Utl(d_r))$. $dns(t,k,t_s,t_e)$ is positive, the product is positive, and the integral is positive. Thus, making a commitment and subsequently canceling it costs. It is beyond the scope of this paper to show that the cost increases as the commitment itself is more tightly constrained and as the commitment falls in more tightly constrained region of the dance card.

The Resource's total charge for moving an engagement is its fee for adding the new engagement minus a modified refund for removing the old. In case there is overlap between the old and new positions of the engagement, the refund is based on the minimum of the utilization functions of the old and new dance cards. This prevents the Resource from disproportionately penalizing a highly constrained Engagement (one with a narrow window, and hence high commitment density function) for making small adjustments. The fee charged for adding the new engagement is based on the dance card that results from removing the old, again in case the old and new engagements overlap. Keep in mind that the initial dance card already contains the old engagement.

Let $d_{new} = d_r \cup \{e_{new}\} - \{e_{old}\}$ $\text{fee}_{move}(e_{old}, e_{new}, d_r) \equiv \text{fee}_{add}(e_{new}, d_r - \{e_{old}\}) - tcf(e_{old}, \min(Utl(d_{new}), Utl(d_r))) = tcf(e_{new}, Utl(d_{new})) - tcf(e_{old}, \min(Utl(d_{new}), Utl(d_r)))$ If the new and old engagements do not overlap, that is, $(T_{s\ new}, t_{e\ new}) \cup (t_{s\ old}, t_{e\ old}) = \phi$, $e_{new}$ is irrelevant to the minimum because the minimum is evaluated only in the region of the old engagement. The utilization of the dance card without the old engagement is less than with the old engagement in that same region.

$$\text{fee}_{move}(e_{old}, e_{new}, d_r) = \text{fee}_{add}(e_{new}, d_r - \{e_{old}\}) -$$

$$tcf(e_{old}, \min(Utl(d_r \cup \{e_{new}\} - \{e_{old}\}), Utl(d_r)))$$

$$= \text{fee}_{add}(e_{new}, d_r - \{e_{old}\}) -$$

$$tcf(e_{old}, \min(Utl(d_r - \{e_{old}\}), Utl(d_r)))$$

$$= \text{fee}_{add}(e_{new}, d_r - \{e_{old}\}) -$$

$$tcf(e_{old}, Utl(d_r - \{e_{old}\}))$$

$$= \text{fee}_{add}(e_{new}, d_r - \{e_{old}\}) + \text{fee}_{remove}(e_{old}, d_r)$$

Thus for a nonoverlapping move, the fee is the same as that charged to remove and add the engagement.

If the new and old engagements are identical (the limit of highly overlapping moves), the fee charged is zero.

$$\text{fee}_{move}(e, e, d_r) = \text{fee}_{add}(e, d_r - \{e\}) -$$
$$tcf(e, \min(Utl(d_r \cup \{e\} - \{e\}), Utl(d_r)))$$
$$= tcf(e, Utl(d_r \cup \{e\} - \{e\})) -$$
$$tcf(e, \min(Utl(d_r), Utl(d_r)))$$
$$= tcf(e, Utl(d_r)) - tcf(e, Utl(d_r))$$
$$= 0$$

Resource Bid Function

A Resource's bid is a prediction of what it will charge a new Engagement. Given a kernel and a dance card, the bid is a function of start and end times that returns the total cost.

Ideally, the bid is $$\text{Bid}_{ideal}(k, d_r)(t_s, t_e) \equiv \text{fee}_{add}(e = (k, t_s, t_e), d_r)$$
$$= tcf_r(e, Utl(d_r \cup \{e\}))$$
$$= \int_{t=t_s}^{t_e} rtu_r(Utl(d_r \cup \{e\}))(t) dns(t, k, t_s, t_e) dt$$

where k comes from the request for bid, $d_r$ comes from the Resource, and $t_s$ and $t_e$ will be determined by the customer.

The complexity of actually passing around the information necessary to compute the ideal bid function leads us to consider an approximation. It is generally the case that a bid will have a window much wider than the kernel, that is, $k \ll t_e - t_s$. Let us define the "wide" commitment density function as $$dns_{wide}(t, k, t_s, t_e) = \begin{cases} 0, & t < t_s \\ \dfrac{k}{t_e - t_s}, & t_s \le t < t_e, \\ 0, & t_e \le t \end{cases}$$

that is, a piecewise constant function. Note that it satisfies the constraints of commitment density functions: it is zero outside the window and $k = \int_{t=-\infty}^{+\infty} dns_{wide}(t, k, t_s, t_e) dt$. It follows from the definition of the standard commitment density function that $$dns(t, k, t_s, t_e) \approx dns_{wide}(t, k, t_s, t_e) \text{ if } k \ll t_e - t_s$$

Another useful "wide" approximation results from noting that the addition of an engagement to a dance card does not affect the utilization function very much if $k \ll t_e - t_s$:

$$utl(d \cup \{e\}) \approx utl(d) \text{ if } k \ll t_e - t_s$$

The "wide" bid is the result of making these two "wide" approximations to the definition of the ideal bid.

$$\text{Bid}_{ideal}(k, d_r)(t_s, t_e) = \int_{t=t_s}^{t_e} rtu_r(Utl(d_r \cup \{e\}))(t) dns(t, k, t_s, t_e) dt$$
$$\approx \int_{t=t_s}^{t_e} rtu_r(Utl(d_r))(t) dns_{wide}(t, k, t_s, t_e) dt,$$
$$\text{if } k \ll t_e - t_s$$
$$\text{Bid}_{wide}(k, d_r)(t_s, t_e) = \int_{t=t_s}^{t_e} bcf_r(t) \frac{k}{t_e - t_s} dt$$

$$= \frac{k}{t_e - t_s} \int_{t=t_s}^{t_e} bcf_r(t) dt$$

For a Resource to communicate a "wide" bid it is only necessary to send its $bcf_r(t)$.

When a Resource receives a Request for Bid from an Operation (via the Operation's Engagement on that Resource), the Resource responds with an explicit representation of its basic cost function. The response is a function of start time and end time, with the Resource's dance card fixed. (The current implementation treats the kernel as fixed, although conceptually it could be varied, for example to do lot splitting. Nothing conceptual or implementational prevents this.) When the Resource transmits a bid, it transmits $$\begin{bmatrix} bcf_r(t) \\ k \end{bmatrix},$$

which is interpreted according to the formula $$\text{Bid}(k, d_r)(t_s, t_e) = \frac{k}{t_e - t_s} \int_{t=t_s}^{t_e} bcf_r(t) dt.$$

Operation's Bid

An Operation receives individual bids from Resources of the required types, and it must produce a single summary bid. The resulting bid is a function of a window, just as its input bids, and is represented the same way (see the previous section). The Operation's bid is dependent on the dance cards of all the Resources that take part, so the dependency on their dance cards is not written explicitly.

The Operation collects the bids it receives from Resources, sorts them by resource type, and finds the minimum bid (over time) of each resource type. Then it sums the minimum bids, producing its resulting bid.

$$\text{Bid}_{op}(k) = \sum_{y \in \{Resource Types\}} \left( \min_{\substack{r \in \{Resources\} \\ \land Type(r) = y}} Bid_{res}(k, d_r) \right)$$

$$\text{Bid}_{op}(k)(t_s, t_e) = \sum_{y \in \{Resource Types\}} \left( \min_{\substack{r \in \{Resources\} \\ \land Type(r) = y}} \left( \frac{k}{t_e - t_s} \int_{t=t_s}^{t_e} bcf_r(t) dt \right) \right)$$

Because the basic cost function $bcf_r(t)$ is nonnegative everywhere, $$\text{Bid}_{op}(k)(t_s, t_e) = \frac{k}{t_e - t_s} \int_{t=t_s}^{t_e} \left( \sum_{y \in \{Resource Types\}} \left( \min_{\substack{r \in \{Resources\} \\ \land Type(r) = y}} bcf_r(t) \right) \right) dt.$$

The Operation's bid can be transmitted and interpreted in the same form as the Resource's bid. The summation inside the integral in the Operation's bid takes the place of the basic cost function in the Resource's bid, so the Operation transmits $$\left[ \sum_{y \in \{Resource\ Types\}} \left( \frac{\min_{\substack{r \in \{Resources\} \\ \wedge Type(r) = y}} bcf_r(t)}{k} \right) \right].$$

Engagement's Estimated Cost Function

An Engagement is on a particular Resource and represents that Resource's commitment among the set of Resources committed to performing an operation. Engagements are required to make estimates of the total fees that will be charged by the other Resources for moving or removing the engagement. The derivation for removing an engagement is similar to that for moving, but simpler.

$$\sum_{r \in \{other\ Resources\}} \text{fee}_{remove}(e, d_r) = \sum_{r \in \{other\ Resources\}} -tcf(e, d_r - \{e\})$$

$$= - \sum_{r \in \{other\ Resources\}} \left( \int_{t=t_s}^{t_e} bcf(t, d_r - \{e\}) dns(t, k, t_s, t_e) dt \right)$$

$$= - \int_{t=t_s}^{t_e} \left( dns(t, k, t_s, t_e) \sum_{r \in \{other\ Resources\}} bcf(t, d_r - \{e\}) \right) dt$$

The sum of the fees of other Resources to move an engagement is similarly dependent on the sum of their basic cost functions. Unfortunately, it is not possible to sum the basic cost functions of the other Resources and subsequently remove or add an engagement to their dance cards (for example $d_r - \{e\}$). There are two possibilities available:

1. store the sum of the basic cost functions of the other Resources and make the "wide" approximation that $d - \{e\} \approx d$, or 2. store the utilization functions and rate based on utilization functions of all the other Resources and calculate the sum of the basic cost functions taking into account removed or moved engagements (such as $d_r - \{e\}$).

For small numbers of Resources per Operation, the second option is appealing. The "wide" approximation is accurate only if the window is much larger than the kernel, and unlike bidding, Engagements will have to move and be removed when their windows are narrow. The amount of data that has to be stored for the second option is not hugely more than that for the first: the rate based on utilization functions are small, having only a few pieces; and if the Resources' utilization functions have few points in common in their meshes, then the sum of the basic cost functions will have about as many pieces as all the utilization functions combined.

Note that in either case, the Engagement only needs the function(s) over the interval of the initial window. Operation's customer finds best CW and commits or aborts the Operation. If committing, customer sends the amount of cash given by the standard formula from the cost function along with its selected CW.

Functions for Committing

Operation, remembering information from the bidding process, commits Engagements on the specific Resources who made the low bids. Engagement, remembering information from the bidding process, pays fee to Resource and inserts itself in the Dance Card; sends debit to Operation. Other Engagements hear that they were not chosen for the bid and are discarded.

Declining

Operation sends message that appears to all Engagements as if some other Engagement got the bid. Engagements discard information they remembered from the bidding process and terminate. Operation terminates.

Functions for Resource Scans for ROVs

A Resource scans his dancecard looking for a Region of Violation (ROV). This is where its expected utilization exceeds a threshold. (The threshold may vary; its setting should depend on target maximum utilization, past performance as a gauge for uncertainty, possibly how far in the future is the part of the dancecard being scanned, etc.) The Resource finds the Engagements that participate in the ROV. It asks each of them the cost to move out of the ROV, picks the lowest cost one(s) and pays it (them) to move. Engagement tells Operation to move, gives it the payment. Then the Resource goes on to scan for another ROV.

Engagement estimates its cost to move based on Resource's cost function and Engagement's estimated cost function of all other Resources. If it is cheaper, Engagement quotes its Renege Fee minus the estimated refund from other Resources.

Functions for Engagement Scans for Cheaper WW

Engagement scans its estimated cost function plus Resource's cost function for the minimum cost WW using a standard formula for calculating fees from cost functions. If the WW it finds is enough better than its current WW that the Operation would actually make money moving to it, the Engagement tells Operation to move to the new WW.

If an Operation's Renege Fee were lower than the refund it would get from the Resources, it seems logical that the Operation should Renege. This is a degenerate situation, however.

Functions for Operation and Engagements Move

Engagement tells Operation to move, passing along a payment if the Resource requested the move. (This payment is in addition to the conventional fee the Resource charges/refunds for moving from the one position to the other.) Operation tells all Engagements to move to the new WW. Each Engagement moves itself on its Resource, gives out payment or collects refund. Then each Engagement passes refund or debit back to Operation. Multiple, simultaneous requests to move WW are serialized through the Operation.

Functions for Operation Reneges

If Resource pays Engagement to renege, Engagement tells Operation to renege and passes along the payment. Operation tells all Engagements to renege. Each Engagement reneges from its Resource, collects refund, and sends it back to Operation. Engagement then ceases. When all Engagements have terminated, Operation ceases.

Functions for Updating Engagements' Estimated Cost Function

When any Engagement decides it needs to update its Estimated Cost Function, or it decides its Resource's Cost Function has changed enough to warrant sending an update to all other Engagements, it sends a request to update to the Operation. The Operation may determine its Engagements need an update on its own, as well. The Operation asks all Engagements for their Resource's cost functions. Each Engagement responds with its Resource's cost function, and remembers what it sent. The Operation sums all the cost functions and sends the result to all Engagements. Each Engagement subtracts the cost function it remembers, and the result is its Estimated Cost Function.

API's

This section identifies the interfaces of the present invention.

Make a tentative reservation

Purpose: Used by an engagement that is trying to formulate a bid.

Prototype: DESK_Inquire(CW.Start, CW.End, K.Len): <Avail:Boolean, Cost:Real, BidID: Integer>;

CW.Start and CW.End are the expected order and due times, respectively, K.Len is the length of time for which the resource is needed. The function returns Avail=TRUE if such a reservations could be added to the resource's current profile without pushing the profile over its threshold, and Avail=FALSE if it cannot. If Avail=TRUE, Cost=the resource's bid for doing this work, and BidID is a unique identifier that the resource can use later to determine the success or failure of its bid.

Behavior: There are at least four different ways to evaluate whether a reservation will fit. These are ordered here from simplest to most complicated. The ordering also reflects how conservative they are: the earlier ones will tend to decline some possible reservations but will be more likely to be able to confirm them when they are committed, while the later ones will encourage more reservations but may not be able to accept commitments when the time comes. Implementation suggestion: do something simple, but keep the others in mind so you don't block later upgrades.

1. For a reservation density of p, if profile of committed reservations exceeds 1-p anywhere within the CW of the new reservation, decline, otherwise accept.
2. Compute the average density of the existing dance card within the CW of the new reservation, and if it exceeds 1-p, decline, otherwise accept.
3. Same as the previous heuristic, but instead of computing the average density with the CW of the new reservation, extend the region to include the limits of any existing reservations that overlap this CW. (Reason: part or all of the kernels of these overlapping reservations can perhaps be shifted out of the region required by the new CW.)
4. Actually try to schedule the new reservation, on a "scratch" copy of the dance card, and report success or failure.

To assess the cost of a proposed bid, the resource should use a convex function of its current level of utilization (e.g., Base Cost Per Unit/(1-Utilization) (see the AARIA short list document for further discussion). It should also take into account the density of the proposed reservation (but this information may not be reliable at this point).

Commit a new reservation

Purpose: Make a firm offer to the reservation.

Prototype: DESK_Commit(BidID, CW.End, K.Len): <Confirm:Boolean, ReservationID:Integer>;

Behavior: The resource adds the reservation to its dance card, applying the method outlined above in Section 0, "Adjusting Reservations," if necessary to keep the profile below threshold. If this mechanism fails, return Confirm= FALSE. Else return Confirm=TRUE and a unique reservation ID. (The return value of this call provides the functionality called for in the design document as a "confirm" message, and should be dressed up syntactically as needed to match that protocol.)

When a new reservation has been successfully added, invoke the mechanism described in Section 0 to see whether a merger is possible and (if so) perform it.

The BidID passed back by the engagement may be used by the resource to track which bids have been successful and thus adjust its bidding performance.

Cancel an existing reservation

Purpose: Tell the resource that its services are no longer required as previously committed.

Prototype: DESK_Cancel(ReservationID);

Behavior: Delete the indicated reservation, and adjust the profile appropriately.

If the reservation has previously been merged with another, special adjustments need to be made. If possible, then a merger is performed.

The embodiments which have been set forth above were for the purpose of illustration and were not intended to limit the invention. It will be appreciated by those skilled in the art that various changes and modifications may be made to the embodiments described in this specification without departing from the spirit and scope of the invention as defined by the appended claims.

It is claimed:

1. An apparatus for scheduling a plurality of tasks to be performed by a resource within predetermined commitment windows, each of said tasks requiring a minimum period of time to be performed within the respective commitment windows, each of said commitment windows having a period of time for performing respective task, comprising:

a working window determinator for determining a working window for each said task, said working windows being the periods of time within which said resource performs each respective task, said working windows having a period of time within the period of the commitment window of the respective task, said working windows containing the minimum task period for the respective task;

a commitment determinator coupled to said working window determinator for determining a varying percentage of commitment which varies over the respective working window for each task to be performed by said resource, each of said percentage of commitments being respectively based upon the working window and upon said minimum task period of each task; and a scheduler coupled to said commitment determinator for flexibly scheduling said resource to perform each said task based upon said determined percentages of commitments and said working windows of said tasks.

2. The Apparatus of claim 1 wherein said minimum task period is a kernel, said percentage of commitment based upon the ratio between said kernel and said working window.

3. An apparatus for determining whether to commit a first resource to perform a first and second task, said first and second tasks respectively having a first and second predetermined commitment window, said first and second commitment windows being the periods of time within which their respective task is to be performed, said first commitment window overlapping with said second commitment window, said first and second tasks requiring respectively a first and second minimum period of time to be performed within their respective commitment windows, comprising:

a working window data structure determinator for establishing a first and second working window data structure with respect to said first resource, said first and second working window data structures representing the periods of time within which said first resource is to perform each respective task, said first and second working window data structures having a period of time within the commitment windows for their respective task, said first and second working window data structures containing the minimum task period for their respective task;

a commitment level determinator having access to said first and second working window data structures for determining a varying commitment level over the respective working window data structure for each task with respect to said first resource, each of said commitment levels varying due to the respective working window data structure and the respective minimum task period of each task for said first resource; and a committor having access to said determined commitment levels for committing said first resource to said first and second tasks based upon said determined commitment levels for said first resource, said first and second tasks having overlapping commitment windows.

4. The Apparatus of claim 3 wherein said commitment levels for each said task is based upon the ratio between the respective said minimum periods of time and the respective working window data structures of each said task.

5. The Apparatus of claim 3 further comprising:

a total commitment determinator connected to said commitment level determinator and to said committor for determining within each said working window data structure of said first resource the total commitment level based upon said determined commitment levels of said first resource.

6. The Apparatus of claim 5 wherein at least a portion of said total commitment level which is within the time interval of said first working window data structure is above a predetermined threshold, each of said working window data structures having a beginning and ending time value, said beginning time value representing the earliest starting time which said first resource is committed to perform a task, said ending time value representing the latest time value which said first resource is committed to perform a task, said apparatus further comprising:

a working window adjuster connected to said total commitment determinator for adjusting the beginning and ending time values of said first and second working window data structures for lowering the total commitment level for the time period which exceeded the predetermined threshold for said first working window data structure, said beginning and ending time values of said adjusted first and second working window data structures being within their respective commitment windows, said first resource committing to perform said first and second task when the lowered total commitment level for the time period which is within the time interval of said first working window data structure is below said predetermined threshold.

7. The Apparatus of claim 5 further comprising:

a cost determinator connected to said total commitment determinator for determining a cost for said first resource to commit to said first task based upon said determined total commitment level for said first working window data structure.

8. The Apparatus of claim 7 wherein a second resource is able to commit to said first task, said second resource having a third working window data structure within which to perform said first task, said third working window data structure having a total commitment level, said first and second resources having a cost to commit to said first task, said apparatus further comprising:

a broker for determining which of said resources is to perform said first task based upon costs of said resources to commit to said first task.

9. The Apparatus of claim 8 further comprising:

a reneger connected to said commitment determinator for reneging a commitment by said first resource to perform said first task, said reneging based upon a cost for said first resource to renege said first task, said cost to renege said first task being based upon the cost to reallocate said first task to another resource.

10. The Apparatus of claim 9 further comprising:

a communicator connected to said reneger for communicating to said second resource from said first resource for said second resource to commit to said reneged commitment.

11. The Apparatus of claim 10 wherein said broker and said first and second tasks and said first and second resources are computerized software agents.

12. A Method for determining whether to commit a first resource to perform a first and second task, said first and second tasks respectively having a first and second predetermined commitment window, said first and second commitment windows being the periods of time within which their respective task is to be performed, said first commitment window overlapping with said second commitment window, said first and second tasks requiring respectively a first and second minimum period of time to be performed within their respective commitment windows, comprising the steps of:

determining a first and second working window with respect to said first resource, said first and second working windows being the periods of time within which said first resource is to perform each respective task, said first and second working windows having a period of time within the commitment windows for their respective task, said first and second working windows containing the minimum task period for their respective task;

determining a varying commitment level which varies over the respective working window for each task with respect to said first resource, each of said commitment levels being respectively based upon the working window and upon said minimum task period of each task for said first resource; and committing said first resource to said first and second tasks based upon said determined commitment levels for said first resource, said first and second tasks having overlapping commitment windows.

13. The Method of claim 12 further comprising the step of:

determining said commitment levels for each said task based upon the ratio between the respective said minimum periods of time and the respective working windows of each said task.

14. The Method of claim 13 further comprising the further step of:

determining within each said working window of said first resource the total commitment level based upon said determined commitment levels of said first resource.

15. The Method of claim 14 wherein at least a portion of said total commitment level which is within the time interval of said first working window is above a predetermined threshold, each of said working windows having a beginning and ending time value, said beginning time value representing the earliest starting time which said first resource is committed to perform a task, said ending time value representing the latest time value which said first resource is committed to perform a task, said method further comprising the step of:

adjusting the beginning and ending time values of said first and second working windows for lowering the total commitment level for the time period which exceeded the predetermined threshold for said first working window, said beginning and ending time values of said adjusted first and second working windows being within their respective commitment windows, said first resource committing to perform said first and second task when the lowered total commitment level for the time period which is within the time interval of said first working window is below said predetermined threshold.

16. The Method of claim 15 further comprising the step of:

determining a cost for said first resource to commit to said first task based upon said determined total commitment level for said first working window.

17. The Method of claim 16 wherein a second resource is able to commit to said first task, said second resource having a third working window within which to perform said first task, said third working window having a total commitment level, said resource having a cost to commit to said first task, said Method further comprising the step of:

determining which of said resources is to perform said first task based upon costs of said resources to commit to said first task.

18. The Method of claim 17 further comprising the step of:

reneging a commitment by said first resource to perform said first task, said reneging based upon a cost for said first resource to renege said first task, said cost to renege said first task being based upon the cost to reallocate said first task to another resource.

19. The Method of claim 18 further comprising the step of:

communicating to said second resource for said second resource to commit to said reneged commitment.

20. The Method of claim 19 further comprising the step of:

determining a cost for said second resource to commit to said reneged commitment based upon the commitment level for said second resource to commit to said reneged commitment.

* * * * *